(12) United States Patent
Tamayama et al.

(10) Patent No.: US 8,831,873 B2
(45) Date of Patent: Sep. 9, 2014

(54) NAVIGATION DEVICE, PROGRAM, AND DISPLAY METHOD

(75) Inventors: Shotaro Tamayama, Chiba (JP); Takaaki Ishii, Kanagawa (JP); Kyoko Okoshi, Kanagawa (JP); Tomohiro Harada, Saitama (JP)

(73) Assignees: Clarion Co., Ltd., Tokyo (JP); Hitachi, Ltd., Tokyo (JP)

( * ) Notice: Subject to any disclaimer, the term of this patent is extended or adjusted under 35 U.S.C. 154(b) by 87 days.

(21) Appl. No.: 13/387,191

(22) PCT Filed: Jul. 30, 2010

(86) PCT No.: PCT/JP2010/062896
§ 371 (c)(1),
(2), (4) Date: May 7, 2012

(87) PCT Pub. No.: WO2011/013796
PCT Pub. Date: Feb. 3, 2011

(65) Prior Publication Data
US 2012/0209506 A1    Aug. 16, 2012

(30) Foreign Application Priority Data

Jul. 31, 2009   (JP) ................................ 2009-179296
Jul. 23, 2010   (JP) ................................ 2010-165964

(51) Int. Cl.
*G01C 21/26*  (2006.01)
*G08G 1/0969*  (2006.01)
*G01C 21/34*  (2006.01)
*G01C 21/36*  (2006.01)

(52) U.S. Cl.
CPC .......... *G01C 21/343* (2013.01); *G01C 21/3679* (2013.01); *G08G 1/0969* (2013.01); *G01C 21/3484* (2013.01)

USPC ........... 701/410; 701/425; 701/426; 701/428; 701/432; 701/461; 701/465; 701/468; 701/533

(58) Field of Classification Search
CPC .. G01C 21/26; G01C 21/343; G01C 21/3484; G08G 1/0969
See application file for complete search history.

(56) References Cited

U.S. PATENT DOCUMENTS 5,940,803 A  *  8/1999  Kanemitsu ..................... 705/6
6,381,534 B2 *  4/2002  Takayama et al. ............ 701/465

(Continued)

FOREIGN PATENT DOCUMENTS

JP    2007-155404    6/2007
JP    2009-002826    1/2009

OTHER PUBLICATIONS

International Search Report dated Oct. 26, 2010 issued in PCT/JP2010/062896.

*Primary Examiner* — John Q Nguyen
*Assistant Examiner* — Edward Torchinsky
(74) *Attorney, Agent, or Firm* — Scully, Scott, Murphy & Presser, P.C.

(57) ABSTRACT

Provided is a navigation technique for aiding a user to develop a plan for traveling around a plurality of destinations. The navigation device causes a display unit to display a first display area and a second display area. The first display area displays icon information for specifying a facility and positional information thereof. The second display area displays a time line of a predetermined period. When the user disposes a plurality of pieces of icon information on the time line, the navigation device retrieves a route for traveling around the disposed facilities in order. As to icon information of a facility at which the user cannot arrive at the time corresponding to a position where the icon information is disposed, the navigation device indicates that the icon information is inappropriate.

15 Claims, 26 Drawing Sheets

(56) References Cited

U.S. PATENT DOCUMENTS

| | | | |
|---|---|---|---|
| 6,748,316 B2 * | 6/2004 | Takayama et al. | 701/428 |
| 2002/0169547 A1 * | 11/2002 | Harada | 701/211 |
| 2010/0223003 A1 * | 9/2010 | Harada | 701/201 |
| 2012/0191341 A1 * | 7/2012 | Nara et al. | 701/420 |

\* cited by examiner

LINK TABLE 200

POI CARD TABLE 250

| POI CARD ID | POI CARD DISPLAY NAME | POI LOCATION INFORMATION | DISPLAY IMAGE |
|---|---|---|---|
| 251 | 252 | 253 | 254 |
|  |  |  |  |
|  |  |  |  |
|  |  |  |  |

FIG. 5

INPUT INFORMATION TABLE 300

| POI CARD ID (301) | PLACED DATE/TIME (302) | LOCK FIELD POINT (303) | ARRIVAL DATE/TIME (304) | STAYING PERIOD (305) | DEPARTURE DATE/TIME (306) |
|---|---|---|---|---|---|
|  |  |  |  |  |  |
|  |  |  |  |  |  |
|  |  |  |  |  |  |

FIG. 6

CHECK RESULT TABLE 350

| DEPARTURE SITE (POI CARD ID) (351) | DESTINATION (POI CARD ID) (352) | DEPARTURE TIME (353) | REQUIRED TIME (354) | ARRIVAL TIME (355) |
|---|---|---|---|---|
|  |  |  |  |  |
|  |  |  |  |  |
|  |  |  |  |  |

FIG. 12
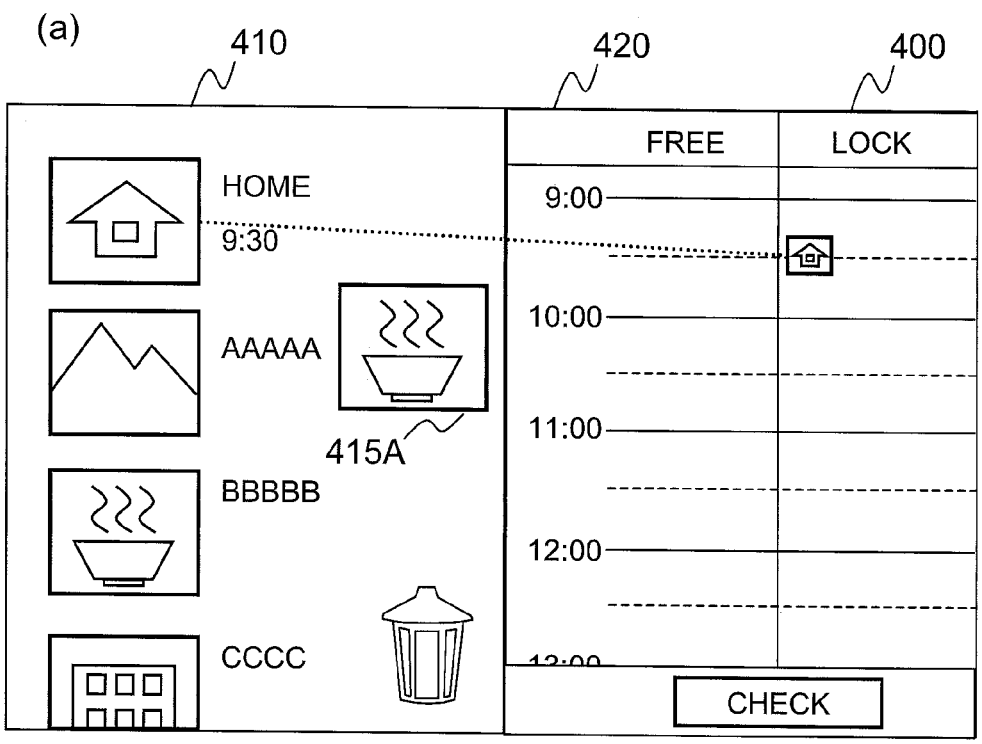
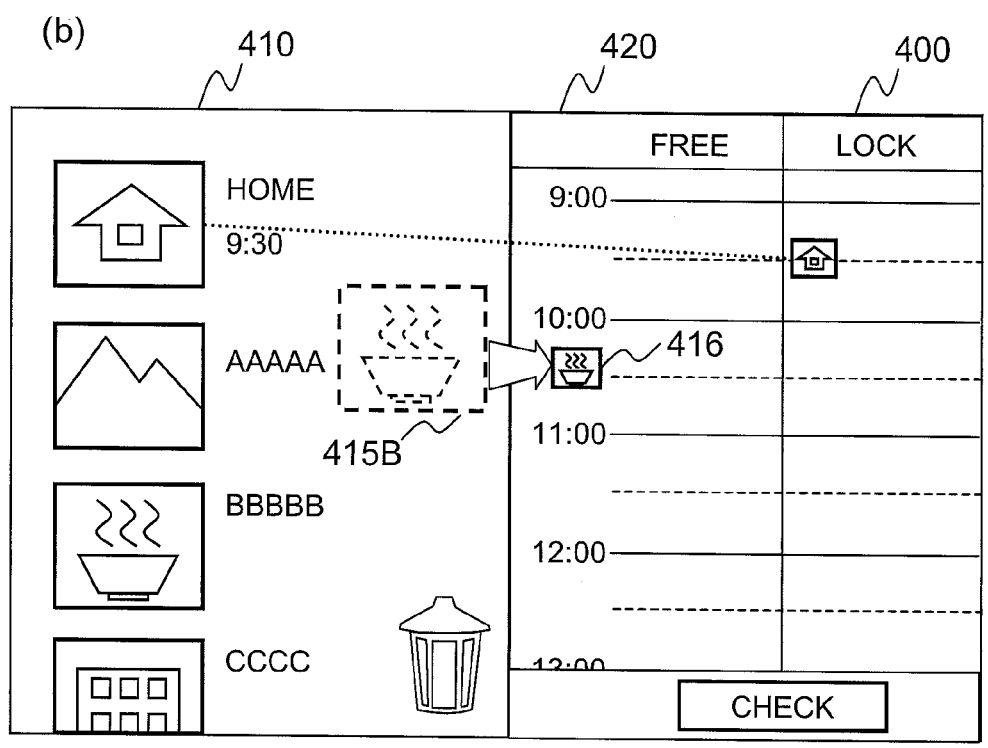

FIG. 13
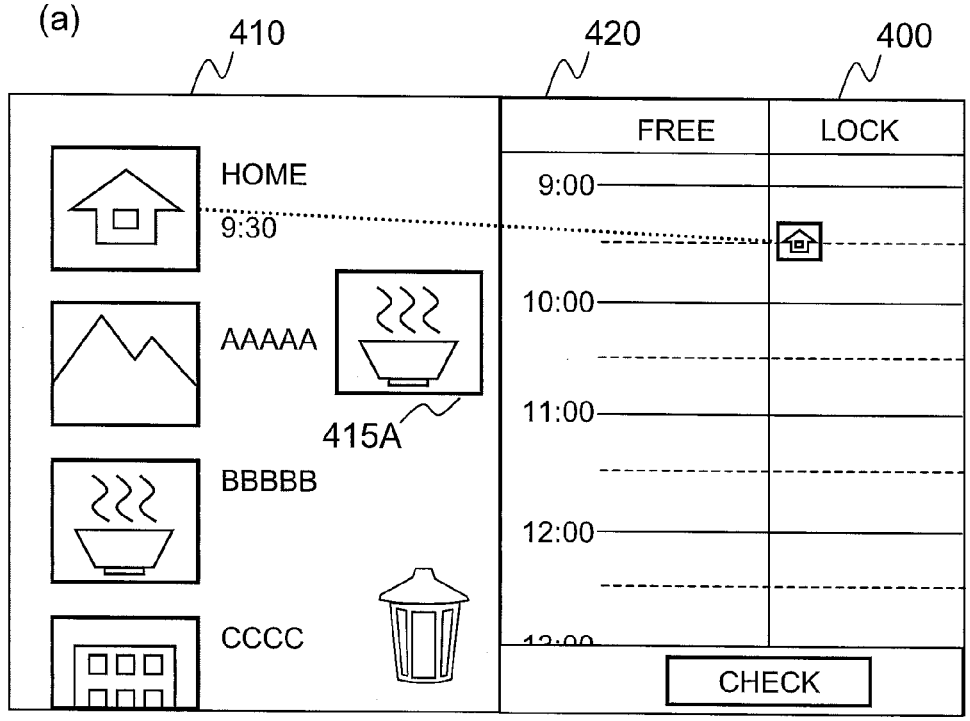
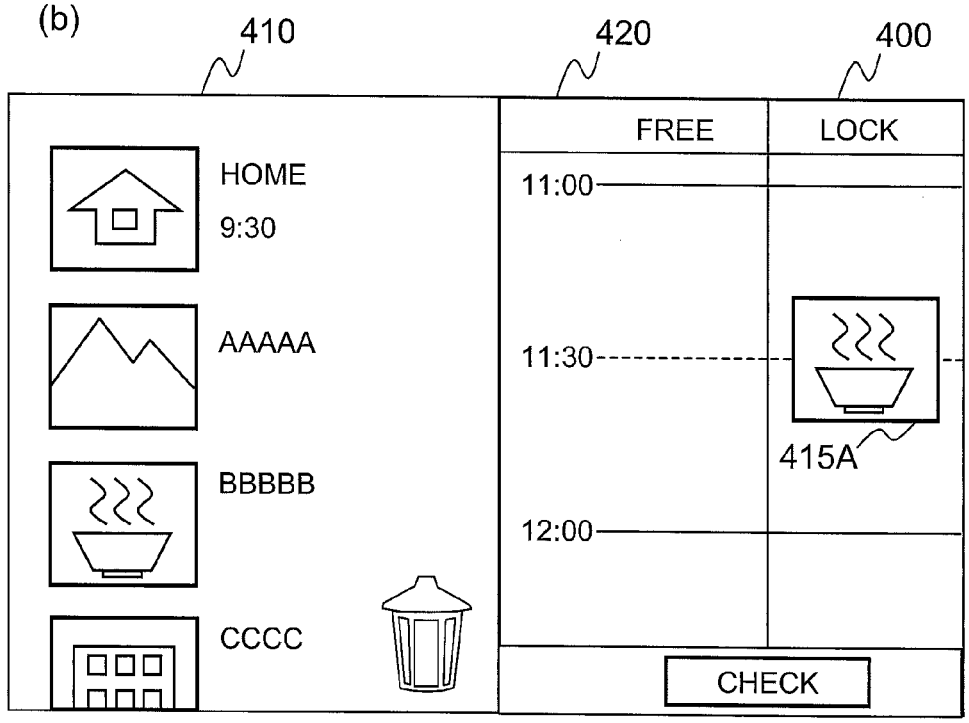

FIG. 14
(a)
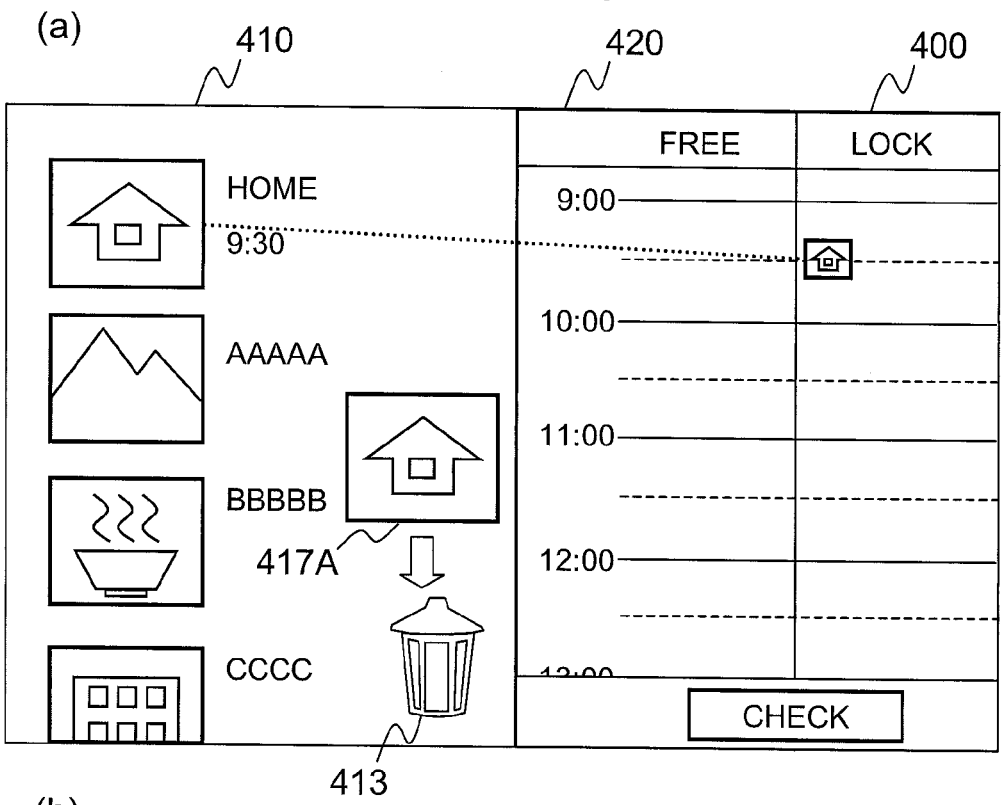
(b)
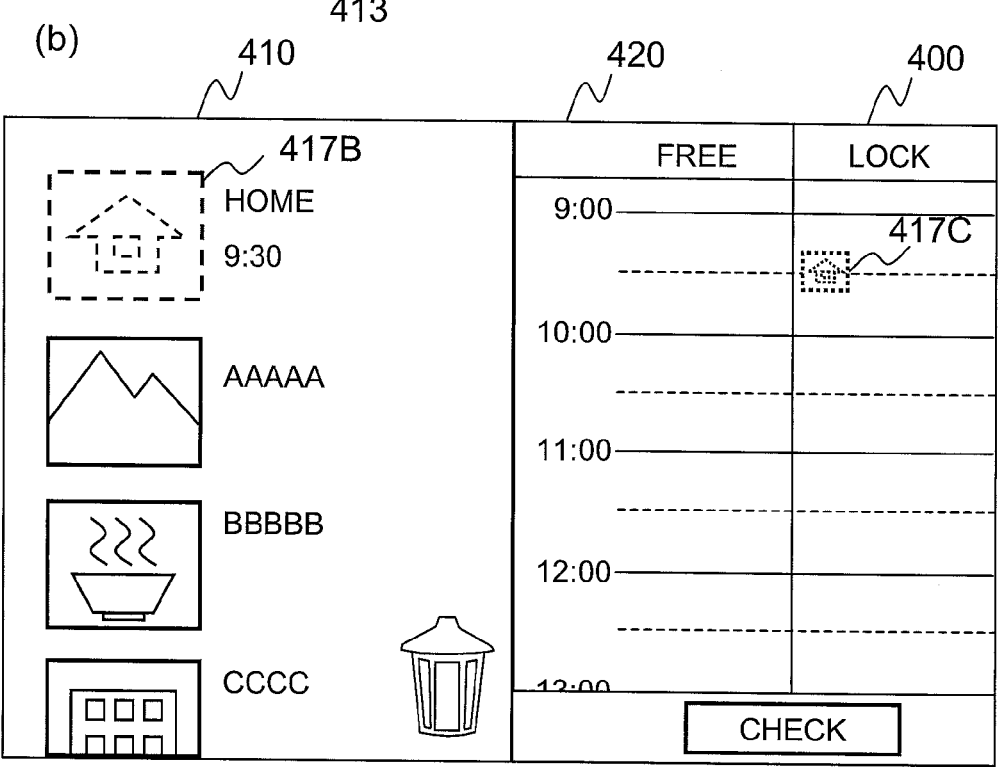

FIG. 16
(a)
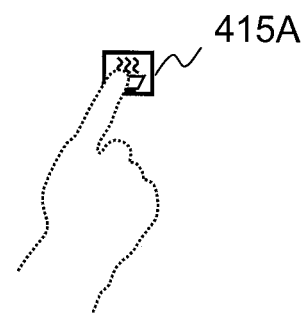
(b)
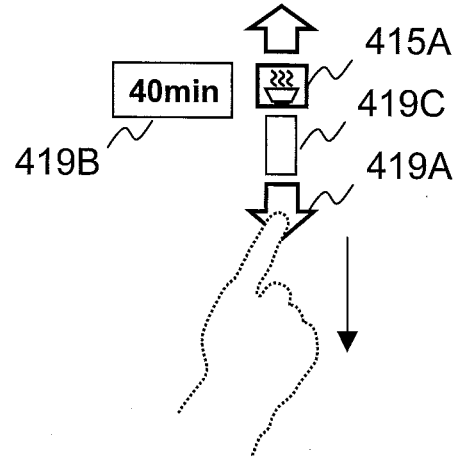
(c)
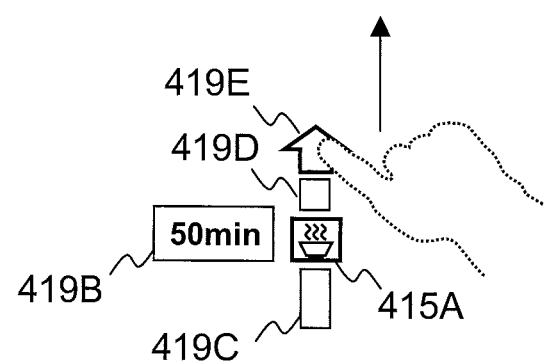

FIG. 21

POI CARD TABLE 250

| POI CARD ID (251) | POI CARD DISPLAY NAME (252) | POI LOCATION INFORMATION (253) | DISPLAY IMAGE (254) | STAYING PERIOD (255) |
|---|---|---|---|---|
|  |  |  |  |  |
|  |  |  |  |  |
|  |  |  |  |  |

FIG. 25
(a)
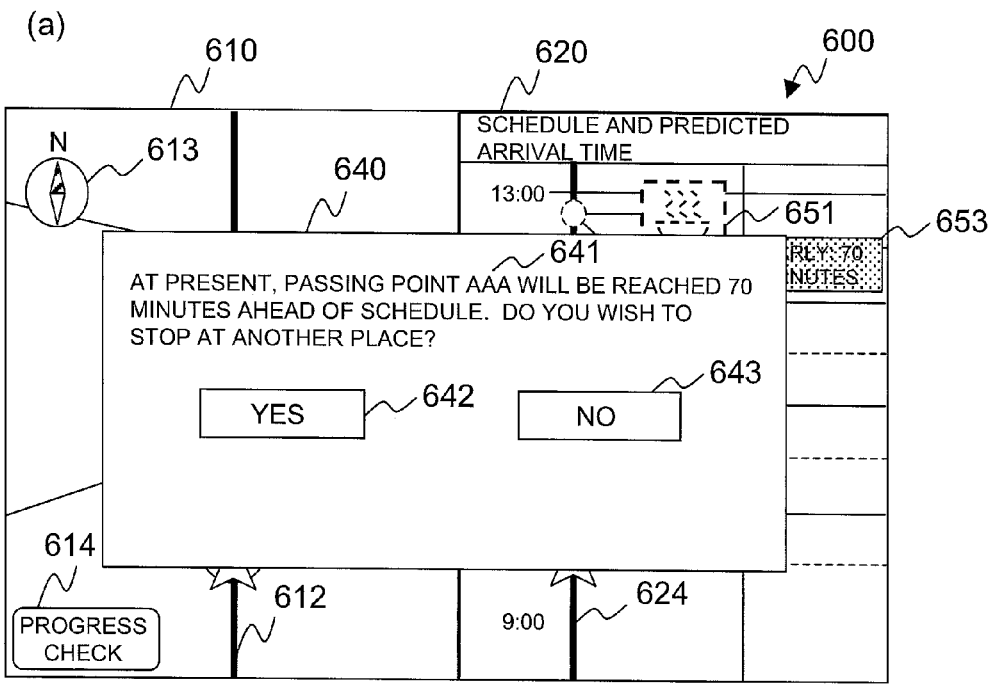
(b)
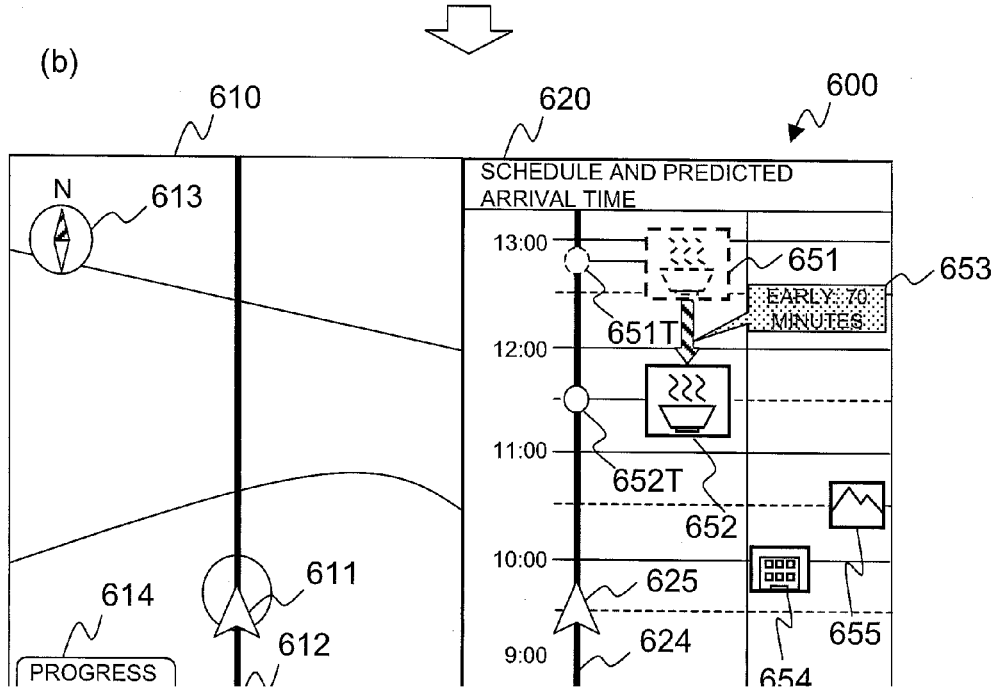

NAVIGATION DEVICE, PROGRAM, AND DISPLAY METHOD

TECHNICAL FIELD

The present invention relates to a technology of a navigation device. This application is based upon and claims the benefit of priority from the corresponding Japanese Patent Application No. 2009-179296, filed on Jul. 31, 2009, and Japanese Patent Application No. 2010-165964, filed on Jul. 23, 2010, the entire contents of which are incorporated herein by reference for designated states that accept the incorporation by reference.

BACKGROUND ART

Conventionally, in navigation devices, there have been used a technology in which designation of a destination is received and a route to the destination is searched, to thereby guide a direction. Patent Literature 1 describes a technology relating to such a navigation device.

CITATION LIST

Patent Literature

[PTL 1] JP 2009-2826 A

SUMMARY OF INVENTION

Technical Problem

However, navigation devices as those described above have difficulties in providing an effective assisting function when a user is drawing up a travel plan that includes visiting a plurality of destinations. To elaborate, a user intending to visit a plurality of destinations draws up in advance a rough travel plan about travel routes, the time required, and others in accordance with estimates that are based on experience or the like, and does not use a navigation device until it is time to input the designation of destinations following the travel plan. This is inconvenient particularly when the user is to travel around an unfamiliar region and in other similar cases where the advance planning of a trip is difficult.

An object of the present invention is to provide a navigation technology that assists a user in drawing up a travel plan that includes visiting a plurality of destinations.

Solution to Problem

In order to solve the above-mentioned problem, according to the present invention, there is provided a navigation device, comprising: display unit; storage unit adapted to store facility information for identifying a plurality of facilities, location information of each of the facilities, and an icon of each of the facilities; and event processing unit adapted to configure a display screen in a manner that causes the display unit to display a first display area for displaying the icons of the facilities and a second display area for displaying a time line of a predetermined period; wherein the event processing unit is configured to: when a plurality of icons displayed in the first display area are placed on the time line displayed in the second display area, use the location information of facilities that are associated with the plurality of icons to search for a route for visiting the facilities in order of the placement of the icons on the time line, and calculate a required time necessary to travel between each of the facilities represented on the time line; and when one of the plurality of icons placed on the time line is of a facility that cannot be reached at a time and date corresponding to a point on the time line where the one of the plurality of icons is placed, display the one of the plurality of the icons as "incompatible"; wherein the second display area comprises a free area; and wherein, in processing of displaying the one of the plurality of icons as "incompatible" when the one of the plurality of icons is of a facility that cannot be reached at a time and date corresponding to a point on the time line of the second display area where the one of the plurality of icons is placed, the event processing unit avoids displaying the icon that is placed in the free area as "incompatible".

Further, according to the present invention, there is provided a storage device that stores a program for a navigation device, the navigation device comprising: control unit; and display unit; the storage device adapted to store facility information for identifying a plurality of facilities, location information of each of the facilities, and an icon of each of the facilities; the program stored on the storage device causing the control unit to execute: a screen configuring step of configuring a display screen in a manner that causes the display unit to display a first display area for displaying the icons of the facilities and a second display area for displaying a time line of a predetermined period; a required time identifying step of, when a plurality of icons displayed in the first display area are placed on the time line displayed in the second display area, using the location information of facilities that are associated with the plurality of icons to search for a route for visiting the facilities in order of the placement of the icons on the time line, and calculating a required time necessary to travel between each of the facilities represented on the time line; and a compatibility displaying step of, when one of the plurality of icons placed on the time line is of a facility that cannot be reached at a time and date corresponding to a point on the time line where the one of the plurality of icons is placed, displaying the one of the plurality of icons as "incompatible"; wherein the second display area comprises a free area; and wherein, in processing of displaying the one of the plurality of icons as "incompatible" when the one of the plurality of icons is of a facility that cannot be reached at a time and date corresponding to a point on the time line of the second display area where the one of the plurality of icons is placed, the program avoids displaying the icon that is placed in the free area as "incompatible".

Further, according to the present invention, there is provided a display method for a navigation device, the navigation device comprising: display unit; storage unit adapted to store facility information for identifying a plurality of facilities, location information of each of the facilities, and an icon of each of the facilities; and event processing unit adapted to configure a display screen in a manner that causes the display unit to display a first display area for displaying the icons of the facilities and a second display area for displaying a time line of a predetermined period; the display method comprising: when a plurality of icons displayed in the first display area are placed on the time line displayed in the second display area, using, by the event processing unit, the location information of facilities that are associated with the plurality of icons to search for a route for visiting the facilities in order of the placement of the icons on the time line, and calculating a required time necessary to travel between each of the facilities represented on the time line; and when one of the plurality of icons placed on the time line is of a facility that cannot be reached at a time and date corresponding to a point on the time line where the one of the plurality of icons is placed, displaying, by the event processing unit, the one of the plurality of icons as "incompatible"; wherein the second display area comprises a free area; and wherein, in processing of displaying the one of the plurality of icons as "incompatible" when the one of the plurality of icons is of a facility that cannot be reached at a time and date corresponding to a point on the time line of the second display area where the one of the plurality of icons is placed, the display method avoids displaying the icon that is placed in the free area as "incompatible".

BRIEF DESCRIPTION OF DRAWINGS

FIG. 5 is a diagram illustrating the configuration of an input information table.

FIG. 6 is a diagram illustrating the configuration of a check result table.

FIGS. 12(a) and 12(b) are a display screen example of the travel plan processing for a case where an icon is moved.

FIGS. 13(a) and 13(b) are another display screen example of the travel plan processing for a case where an icon is moved.

FIGS. 14(a) and 14(b) are a display screen example of the travel plan processing for a case where an icon deleting operation is performed.

FIGS. 16(a), 16(b), and 16(c) are another screen display example of the travel plan processing for a case where an icon is touched.

FIG. 21 is a diagram illustrating the configuration of a POI card table in a second embodiment.

FIGS. 25(a) and 25(b) are a screen display example of the modification suggestion processing for a case where the arrival is earlier than scheduled.

DESCRIPTION OF EMBODIMENTS

A navigation system at which a first embodiment of the present invention is applied is described below with reference to the drawings.

Figure 1:
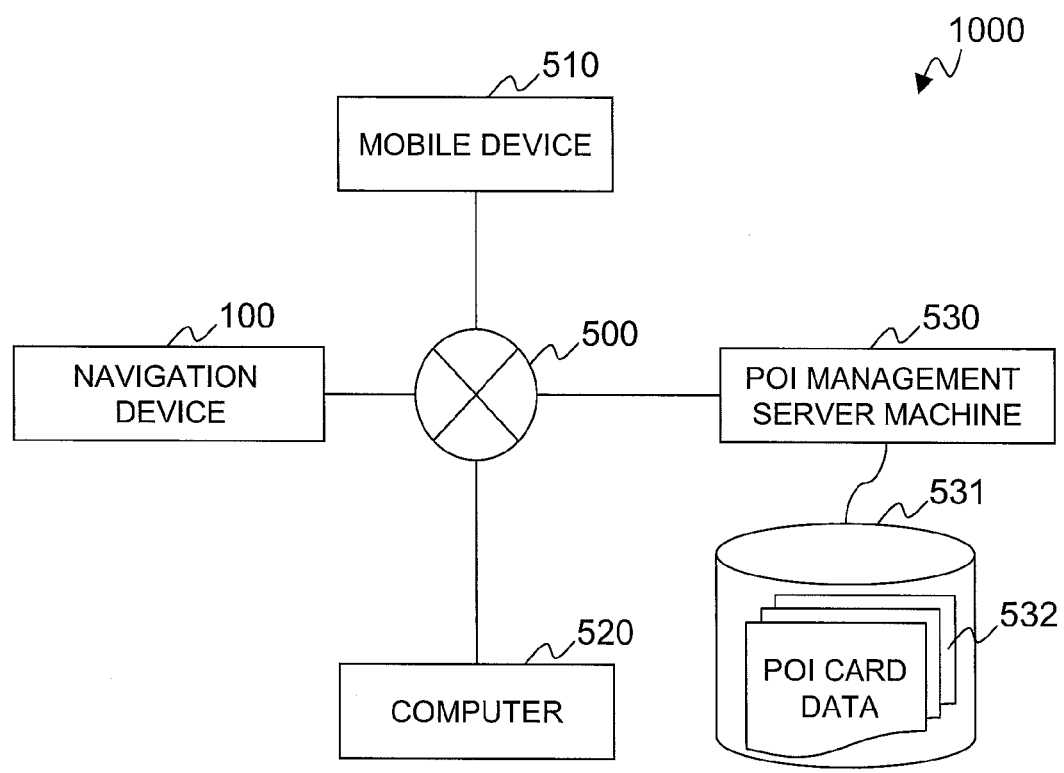
FIG. 1 is a schematic configuration diagram of a navigation system.

FIG. 1 illustrates the overall configuration of a navigation system 1000.

The navigation system 1000 is a system that allows a navigation device 100, a mobile device 510, a computer 520, and a point of interest (POI) management server machine 530 to communicate with one another over a network 500. The navigation system 1000 includes at least one type selected from the navigation device 100, the mobile device 510, the computer 520, and the POI management server 530, and is provided with one or more of the type. However, the navigation system 1000 does not need to include more than one mobile device 510 and more than one computer 520.

The navigation device 100 is a so-called navigator capable of displaying map information and presenting route guidance information about a route from a point that represents the current location of the navigation device 100 to a set destination. The navigation device 100 can communicate with the POI management server machine 530 over the network 500 to transmit a request for POI card data 532 to the POI management server machine 530, and to receive the transmitted POI card data 532. Receiving the POI card data 532, the navigation device 100 performs such operations as using the POI card data 532 and processing the POI card data 532. The navigation device 100 may include an image pickup device such as a digital camera, or a device similar to an image pickup device, to transmit picked-up image data to the POI management server machine 530 and request the POI management server machine 530 to register the image data as POI card information.

The mobile device 510 is an information processing device that is easy to carry around, for example, a cellular phone terminal, and can communicate with the POI management server machine 530 and other components over the network 500. The mobile device 510 includes an image pickup device such as a digital camera, or a device similar to an image pickup device, to transmit a picked-up image to the POI management server machine 530 and request the POI management server machine 530 to register the image as POI card information.

The computer 520 is an information processing device, for example, a personal computer, and can request the POI management server machine 530 to register POI card information as the mobile device 510 does. The computer 520 includes an image pick up device such as a digital camera, or a device similar to an image pickup device, to transmit a picked-up image to the POI management server machine 530 and request the POI management server machine 530 to register the image as POI card information.

The POI management server machine 530 is an information processing device capable of receiving over the network 500 a request for the registration of POI card information and storing the POI card information in storage 531 as the POI card data 532. Receiving a request for the POI card data 532 stored in the storage 531, the POI management server machine 530 reads the POI card data 532 and transmits the POI card data 532 to the requester over the network 500. One piece of POI card information is associated with one facility. However, associating a plurality of pieces of POI card information with one facility poses no problems.

The network 500 is a wide-area communication network that can be connected to the Internet or other open networks, and examples of the network 500 include a cellular phone communication network and a network of an internet provider. The network 500 may also be a communication network available to specific users, such as various local area networks (LANs) and wide area networks (WANs).

Figure 2:
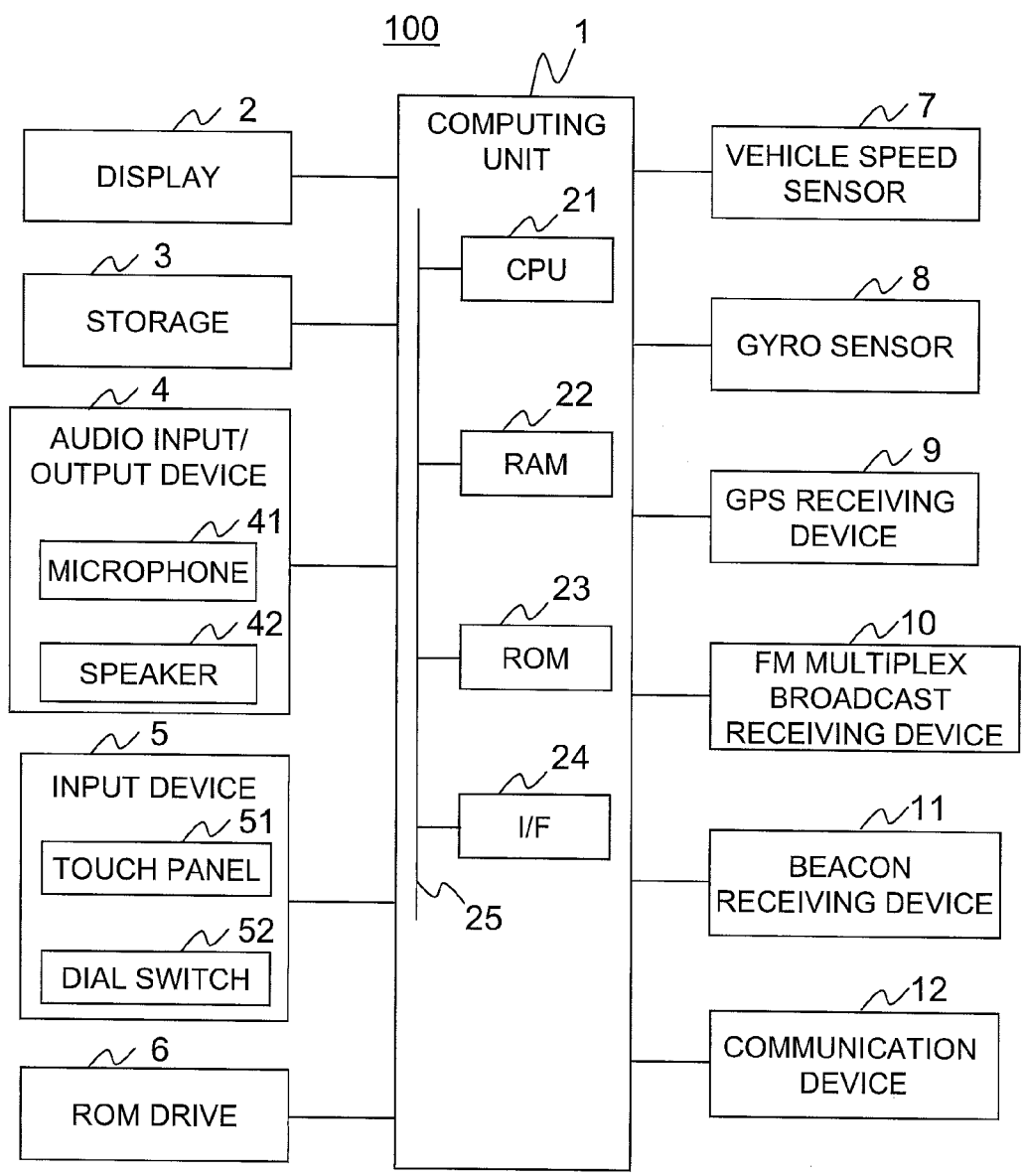
FIG. 2 is a schematic configuration diagram of a navigation device.

FIG. 2 illustrates the configuration of the navigation device 100.

The navigation device 100 includes a computing unit 1, a display 2, a storage 3, an audio input/output device 4 (which includes a microphone 41 as an audio input device and a speaker 42 as an audio output device), an input device 5, a ROM device 6, a vehicle speed sensor 7, a gyro sensor 8, a global positioning system (GPS) receiving device 9, an FM multiplex broadcast receiving device 10, a beacon receiving device 11, and a communication device 12.

The computing unit 1 is a central unit that handles various types of processing. For example, the computing unit 1 detects the current location based on information output from various sensors including 7 and 8, the GPS receiving device 9, the FM multiplex broadcast receiving device 10, and others. The computing unit 1 also reads map data necessary for display out of the storage 3 or the ROM drive 6 based on the obtained current location information.

The computing unit 1 develops the read map data into graphics, superimposes a mark that represents the current location on the graphics, and then displays the graphics on the display 2. The computing unit 1 also uses map data stored in the storage 3 or the ROM drive 6 to search for an optimum route (a recommended route) connecting a departure site (the current location) and a destination (or a passing point or a stop) that are designated by the user. The computing unit 1 also uses the speaker 42 and the display 2 to guide the user.

The computing unit 1 performs processing of assisting the drawing of a travel plan that involves planning a route by combining a plurality of destinations. For instance, the computing unit 1 searches for a route for a travel between designated destinations, calculates a travel time necessary for the travel, determines whether or not a scheduled arrival time can be kept, and shows the result.

The computing unit 1 of the navigation device 100 is configured to connect its constituent devices to one another with a bus 25. The computing unit 1 includes a central processing unit (CPU) 21, which executes various types of processing such as numerical calculation and control of the constituent devices, a random access memory (RAM) 22, which stores map data read out of the storage 3, arithmetic data, and the like, a read only memory (ROM) 23, which stores a program and data, and an interface (I/F) 24, which connects various hardware components to the computing unit 1.

The display 2 is a unit that displays graphics information generated by the computing unit or others. The display 2 is constituted of a liquid crystal display, an organic EL display, or the like.

The storage 3 is constituted of a storage medium capable of at least reading and writing, such as an hard disk drive (HDD) or a non-volatile memory card.

The storage medium stores a link table 200, which is map data (including link data of links that constitute roads on a map) necessary for a normal route search device, a POI card table 250, which stores location information and the like for each POI, an input information table 300, which temporarily stores information in which POI points are placed on a time line, and a check result table 350, which stores information for determining for each POI placed on a time line whether or not an arrival time can be kept.

Figures 3, 4:
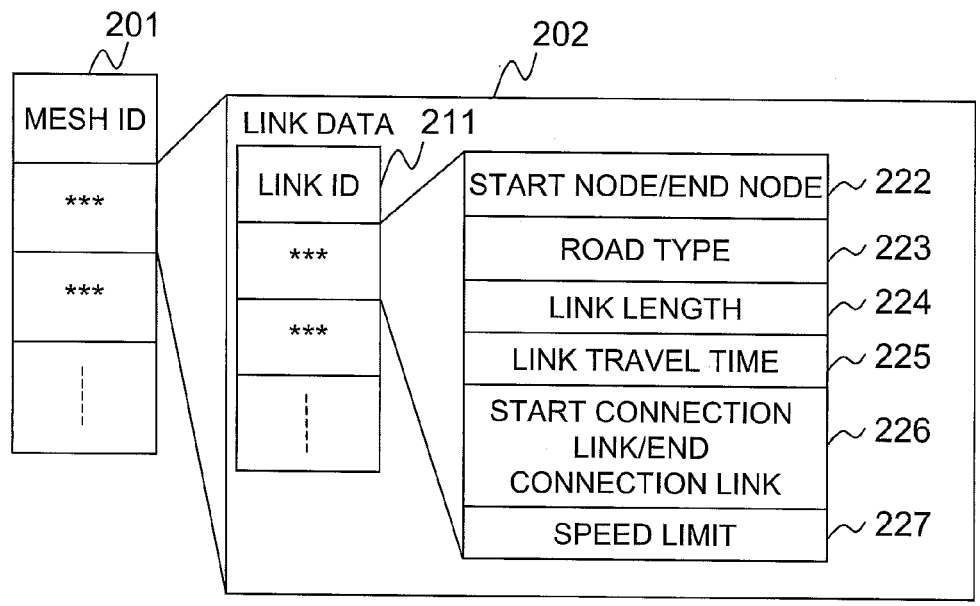
FIG. 3 is a diagram illustrating the configuration of a link table.
FIG. 4 is a diagram illustrating the configuration of a POI card table.

FIG. 3 is a diagram illustrating the configuration of the link table 200. For each identification code (mesh ID) 201 of a mesh which is a partitioned area on a map, the link table 200 contains link data 202 of each link that constitutes a road contained in the mesh area.

For each link ID 211 which is the identifier of a link, the link data 202 contains, among others, coordinate information 222 of two nodes (a start node and an end node) that constitute the link, a road type 223, which indicates the type of a road that includes the link, a link length 224, which indicates the length of the link, a link travel time 225, which is stored in advance, a start connection link/end connection link 226 for identifying a link that is connected to the start node of the link in question and a link that is connected to the end node of the link in question, and a speed limit 227, which indicates the speed limit of a road that includes the link.

Two nodes that constitute a link are discriminated here from each other as a start node and an end node in order to manage the up direction and down direction of the same road as separate links.

FIG. 4 is a diagram illustrating the configuration of the POI card table 250. The POI card table 250 stores a POI card ID 251, which is information for identifying each piece of POI card data 532, a POI card display name 252, which is information for identifying a POI card display name, POI location information 253 for identifying a POI location, and a display image 254 for identifying an image that is used to display the POI card in the form of an icon.

Stored as the POI card ID 251 is an identifier for identifying each piece of POI card data 532. Stored as the POI card display name 252 is information for identifying what name is displayed when the POI card data 532 is displayed on the display 2 or the like. For example, when "Chinese Noodle Place oo" is stored as the POI card display name 252, it is an instruction that an icon or the like of this POI card be displayed as "Chinese Noodle Place oo".

Stored as the POI location information 253 is information for identifying where a POI is located. For example, information for identifying a given point (e.g., in front of the main gate) of a POI, namely, information for identifying the address or the latitude/longitude is stored as the POI location information 253. Stored as the display image 254 is information for identifying an icon image that is displayed when the POI card data 532 is displayed on the display 2 or the like.

The information stored in the POI card table 250 may be predetermined information, or information that is maintained by updating as the need arises based on received information which is transmitted from the POI management server machine 530 via the communication device 12.

FIG. 5 is a diagram illustrating the configuration of the input information table 300. The input information table 300 stores a POI card ID 301, which is an identifier for identifying each piece of POI card data 532, a placed date/time 302 for identifying a date/time on a time line where the POI card is placed, a lock field point 303 for identifying a display point on the time line where the POI card is placed, an arrival date/time 304 for identifying a scheduled arrival date/time on the time line for this POI, a staying period 305 for identifying a scheduled length of stay at this POI, and a departure date/time 306 for identifying a date/time at which the user leaves this POI for the next destination (throughout this application, the term "date/time" is intended to refer to a time and date).

Stored as the POI card ID 301 is an identifier for identifying each piece of the POI card data 532. Stored as the placed date/time 302 is information that indicates a time on a time line where this POI card data is placed, for example, information for identifying a time.

Stored as the lock field point 303 is information that indicates a lateral point on the time line where this POI is placed. For example, information such as "0", "1", "2", or "3" is stored as the lock field point 303. In this example, the value "0" of the lock field point 203 means that this POI is placed in a free area which is indicated as "Free" on the time line, and the value "1" of the lock field point 203 means that this POI is placed in a left-end area (column) of a lock area which is indicated as "Lock" on the time line. Similarly, the value "2" or "3" of the lock field point 203 means that this POI is placed in the second or third area (column) from the left end of the lock area on the time line. Identifying an area (column) within the lock area prevents an overlap in which a POI and display information incidental to this POI are displayed for other POI points.

Stored as the arrival date/time 304 is information for identifying a scheduled arrival date/time on the time line for this POI. Stored as the staying period 305 is information for identifying a scheduled length of stay at this POI. Stored as the departure date/time 306 is information for identifying a date/time at which the user leaves this POI for the next destination.

FIG. 6 is a diagram illustrating the configuration of the check result table 350. The check result table 350 stores a departure site 351, which is information for identifying a POI card ID that indicates a departure site, a destination 352, which is information for identifying a POI card ID that indicates a destination, a departure time 353, which is a time when the user departs from the departure site, a required time 354 required to travel from the departure site to the destination, and an arrival time 355 at which the user arrives at the destination.

Stored as the departure site 351 is information for identifying one of two successive POI card IDs of POI points placed on a time line that has an earlier placed date/time (a time on a time line) than the other. Stored as the destination 352 is information for identifying one of the POI points placed on the time line that follows the POI stored as the departure site 351 (the next POI in the order of placed date/time). Stored as the departure time 353 is information for identifying a date/time at which the user departs after a stay at the POI stored as the departure site 351. Stored as the required time 354 is a length of time necessary to travel along a route from the POI stored as the departure site 351 to the POI stored as the destination 352. Stored as the arrival time 355 is information for identifying a date/time at which the user arrives at the POI stored as the destination 352.

Returning to FIG. 1, the audio input/output device 4 includes the microphone 41 as an audio input device and the speaker 42 as an audio output device. The microphone 41 picks up sounds outside the navigation device 100, such as the voice of the user or passengers.

The speaker 42 outputs in an audio form a message to the user which is generated by the computing unit 1. The microphone 41 and the speaker 42 are separately disposed in given parts of a vehicle. Alternatively, the microphone 41 and the speaker 42 may be housed in a unitary housing. The navigation device 100 may include a plurality of microphones 41 and a plurality of speakers 42.

The input device 5 is a device that receives an instruction from the user when operated by the user. The input device 5 is constituted of a touch panel 51, a dial switch 52, and other hardware switches (not shown) such as a scroll key and a scale changing key.

The touch panel 51 is mounted on the display screen side of the display 2 and the display screen is visible through the touch panel 51. The touch panel 51 identifies a touch point that corresponds to the X-Y coordinates of an image displayed on the display 2, converts the touch point into coordinates, and outputs the coordinates. The touch panel 51 is constituted of a pressure-sensitive or electrostatic input sensing device or the like.

The dial switch 52 is configured in a manner that allows the dial switch 52 to turn clockwise and counterclockwise, generates a pulse signal each time the dial switch 52 turns by a given angle, and outputs the pulse signal to the computing unit 1. The computing unit 1 obtains the turning angle from the count of pulse signals.

The ROM drive 6 is constituted of a storage medium capable of at least data read, such as a CD-ROM, a DVD-ROM, or other read-only memories (ROMs), or an integrated circuit (IC) card. The storage medium stores, for example, video data or audio data.

The vehicle speed sensor 7, the gyro sensor 8, and the GPS receiving device 9 are used by the navigation device 100 to detect the current location (own-vehicle location).

The vehicle sensor 7 is a sensor that outputs a value used to calculate the vehicle speed.

The gyro sensor 8 is constituted of a fiber optic gyro, a vibrating structure gyro, or the like, and detects an angular velocity caused by the rotation of a moving object.

The GPS receiving device 9 receives a signal from a GPS satellite, and measures for each of three or more GPS satellites the distance between a moving object and the GPS satellite and the rate of change in distance, to thereby measure the current location, traveling speed, and traveling direction of the moving object.

The FM multiplex broadcast receiving device 10 receives an FM multiplex broadcast signal transmitted from an FM multiplex broadcast station. An FM multiplex broadcast includes, among others, summarized current traffic information, traffic control information, service area/parking area (SA/PA) information, parking information, weather forecast information, and the like of vehicle information communication system (VICS: registered trademark) information, and text information provided by a radio station as FM multiplex general information.

The beacon receiving device 11 receives summarized current traffic information, traffic control information, service area/parking area (SA/PA) information, parking information, weather forecast information, emergency warning information, and the like of VICS information or other sources. For example, the beacon receiving device 11 is a device for receiving an optical beacon which is communicated by way of light or a radio beacon which is communicated by way of radio waves.

The communication device 12 connects to the network 500. This communication device 12 is a device that connects to, for example, a cellular phone network to communicate data with other devices over the network 500. Examples of the communication device 12 include a device that is capable of communication when attached to the user's cellular phone.

Figure 7:
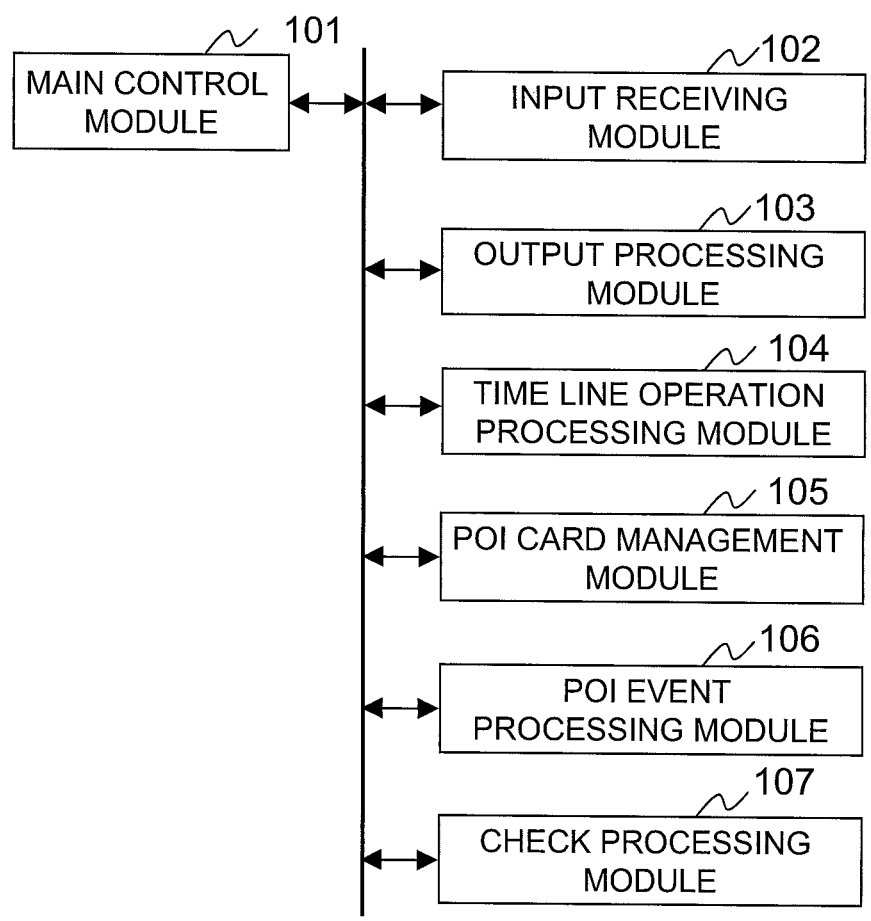
FIG. 7 is a function configuration diagram of a computing unit.

FIG. 7 is a functional block diagram of the computing unit 1. As illustrated, the computing unit 1 includes a main control module 101, an input receiving module 102, an output processing module 103, a time line operation processing module 104, a POI card management module 105, a POI event processing module 106, and a check processing module 107.

The main control module 101 is a central function module which handles various types of processing, and controls other processing modules in accordance with what processing is to be performed. The main control module 101 also obtains information of various sensors, the GPS receiving device 9, and others to identify the current location by map matching or the like. As the need arises, the main control module 101 stores for each link a drive history which associates the date and time of a drive with a location in the storage 3. The main control module 101 further outputs the current time in response to requests from the processing modules. The main control module 101 also searches for an optimum route (recommended route) connecting a departure site (the current location) and a destination that are designated by the user, and guides the user with the speaker 42 and the display 2 to keep the user from straying from the recommended route.

The input receiving module 102 receives an instruction from the user which is entered via the input device 5 or the microphone 41, and controls the components of the computing unit 1 so that processing that meets what is requested by the instruction is executed. For example, when the user's request is to search for a recommended route, the input receiving module 102 requests the output processing module 103 to execute processing of displaying a map on the display 2 in order to set a destination.

The output processing module 103 receives screen information to be displayed, for example, polygon information, converts the screen information into signals for drawing on the display 2, and instructs the display 2 to draw.

The time line operation processing module 104 receives an operation that is made to a time line display area on a screen displayed on the display 2 (e.g., placing POI icons), and then performs various types of processing such as identifying a time that corresponds to the place of a POI icon.

The POI card management module 105 is configured to request, as the need arises, from the POI management server machine 530, POI card information that represents destinations to be included in a travel plan drawn up on the navigation device 100, and to place the received POI card information in the time line display area.

The POI event processing module 106 receives the input of an operation performed on a POI icon and processes an event for the POI icon. For example, when a touch to a POI icon is detected, processing associated with the touch operation, for example, displaying a handle object for designating a staying period, is performed to reflect the operation entered by the user.

The check processing module 107 determines for each POI displayed in the time line display area whether or not the scheduled arrival date/time of the POI can be kept when the user travels in the order of the placement of POI points on the time line, and displays the result.

The function modules of the computing unit 1 described above, namely, the main control module 101, the input receiving module 102, the output processing module 103, the time line operation processing module 104, the POI card management module 105, the POI event processing module 106, and the check processing module 107, are constructed by the CPU 21 reading and executing a given program. The RAM 22 therefore stores a program for implementing the processing of the respective function modules.

The components described above are classified by their main processing specifics to make it easy to understand the configuration of the navigation device 100. Accordingly, how the components are classified or the names of the components do not limit the present invention. The configuration of the navigation device 100 may be broken into more components based on their processing specifics, or into components each of which executes more types of processing.

The function modules may instead be constructed by hardware (an ASIC, a GPU, and the like). The processing of the respective function modules may be executed by a single hardware component or a plurality of hardware components.

[Description of Operation]

The operation of the navigation device 100 is described next.

Figure 8:
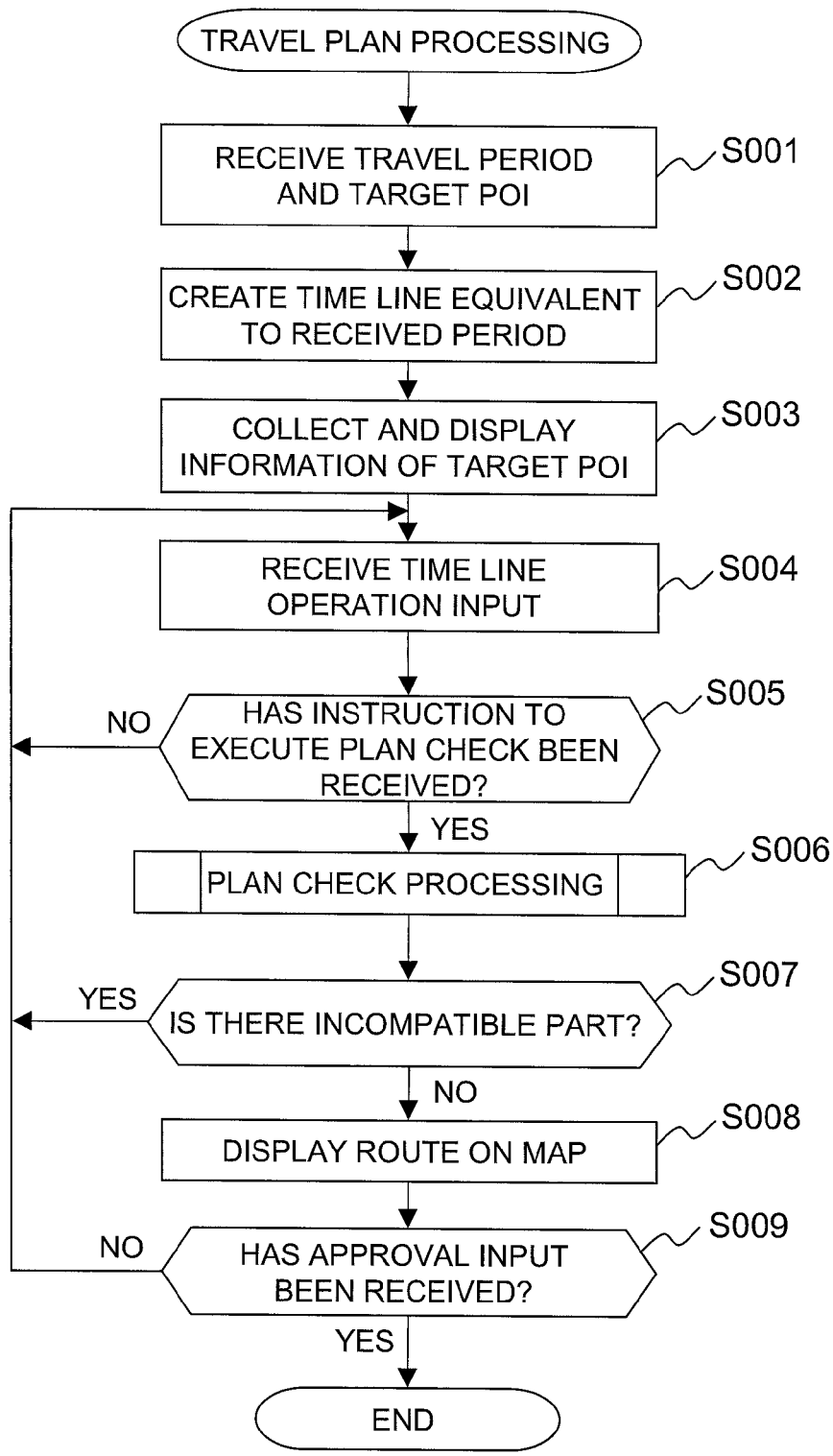
FIG. 8 is a flow chart of travel plan processing.

FIG. 8 is a flow chart of travel plan processing in which the time line of a travel is edited upon the user's instruction to start drawing up a travel plan. This flow is executed when a given operation, for example, a start-up instruction on an operation menu, is received while the navigation device 100 is in operation.

First, the input receiving module 102 receives a travel period entered by the user and the designation of POI points that are destinations (Step S001). Specifically, the input receiving module 102 receives the designation of information for identifying a plurality of destinations and the designation of a travel date.

Next, the time line operation processing module 104 creates time line display information that corresponds to the designated period (Step S002). Specifically, in the case where the received travel period is one-day long, the time line operation processing module 104 creates time line information that divides a period from 0 o'clock of the day of travel to 0 o'clock of the next day into unit-length (e.g., thirty minutes) segments. The created time line information may be for a given period containing the day of travel (for example, three days including the day before and the day after), instead of just the day of travel. The time line information in this embodiment has a time axis in the longitudinal direction of the screen (the longitudinal direction of the navigation device 100 that is used in a normal manner), and has a free area and a lock area in the lateral direction of the screen. The information in the longitudinal direction of the screen and the information in the lateral direction of the screen may be switched as long as similar elements are provided. In other words, the time line information may have a time axis in the lateral direction and a free area and a lock area in the longitudinal direction of the screen.

Next, the POI card management module 105 collects pieces of POI card data that correspond to the designated destinations and displays the data as POI icons (Step S003). Specifically, the POI card management module 105 obtains pieces of POI card information stored in the POI card table 250 that are identified by the information for identifying a plurality of destinations designated in Step S001. In this step, the POI card management module 105 may obtain latest POI card information by requesting the latest information of the relevant POI card information from the POI card management server machine 530 over the network 500. For instance, when the information for identifying a plurality of destinations is "one-day drive to and from Hakone", the POI card management module 105 identifies relevant POI card information from information for identifying a plurality of destinations (not shown) that is associated with the "one-day drive to and from Hakone", identifies a POI card ID, and requests latest location information, icon-use display image information, and the like for the POI card ID from the POI management server machine 530. The POI card management module 105 uses the latest POI card data 532 received from the POI management server machine 530 to update information in the POI card table 250, creates icon information that represents the display image 254 of this POI card, and displays the information in a POI card display area (described later) of a screen displayed on the display 2.

Next, the time line operation processing module 104 receives input information of an operation performed on the time line (Step S004). Specifically, the time line operation processing module 104 receives the specifics of an operation performed by the user on the time line information, and executes processing that reflects the operation specifics. For example, as will be described later, the time line operation processing module 104 executes icon moving processing in response to a drag-and-drop operation performed on an icon that is associated with the POI card information.

The POI event processing module 106 performs, for example, handle processing for designating the staying period in association with an operation in which an icon placed on the time line is touched. Details of this processing, too, are described later.

Next, the check processing module 107 determines whether or not an instruction to execute plan checking processing has been received (Step S005). Specifically, the check processing module 107 determines whether or not a touch operation has been made in which a check button is touched on a screen 400 described later. The check processing module 107 moves the processing to Step S006 in the case where the touch operation has been performed on the check button, and, in the case where the touch operation has not been performed, returns the processing to Step S004 to receive more time line operation inputs.

In the case where an instruction to execute plan checking processing has been received ("Yes" in Step S005), the check processing module 107 executes plan checking processing described later (Step S006).

The check processing module 107 next determines whether or not an incompatible part, namely, a POI placement that makes the user late for the arrival time of a locked POI, is found as a result of a check made by the plan checking processing (Step S007). Specifically, if there is an incompatible part on the time line, the check processing module 107 determines that the whole plan is incompatible and returns the processing to the time line operation input receiving processing of Step S004 in order to prompt an adjustment of the plan.

When there is no incompatible part, in other words, when there is no problem that affects the time of arrival at a locked POI ("No" in Step S007), the check processing module 107 constructs a screen by superimposing the route on a map and displays the screen to ask the user whether the user approves this plan or not (Step S008).

The check processing module 107 then determines whether or not an approval has been input as a result of the inquiry about approving the plan (Step S009). The check processing module 107 ends the travel plan processing in the case where the approval input has been received. In the case where the approval input has not been received, the check processing module 107 returns the processing to the time line operation input receiving processing of Step S004 in order to prompt an adjustment of the plan.

Specifics of the travel plan processing have been described. Through the travel plan processing described above, the navigation device 100 searches for a specific route and provides an actually needed travel time and other types of reference information for a travel plan which conventionally is drawn up by the user by making a rough calculation on paper or in his/her head. In the travel plan processing, the main control module 101 may set destinations and a recommended route using POI information and route information of a travel plan to which the user has given the final approval, to present route guidance to the user.

Figure 9:
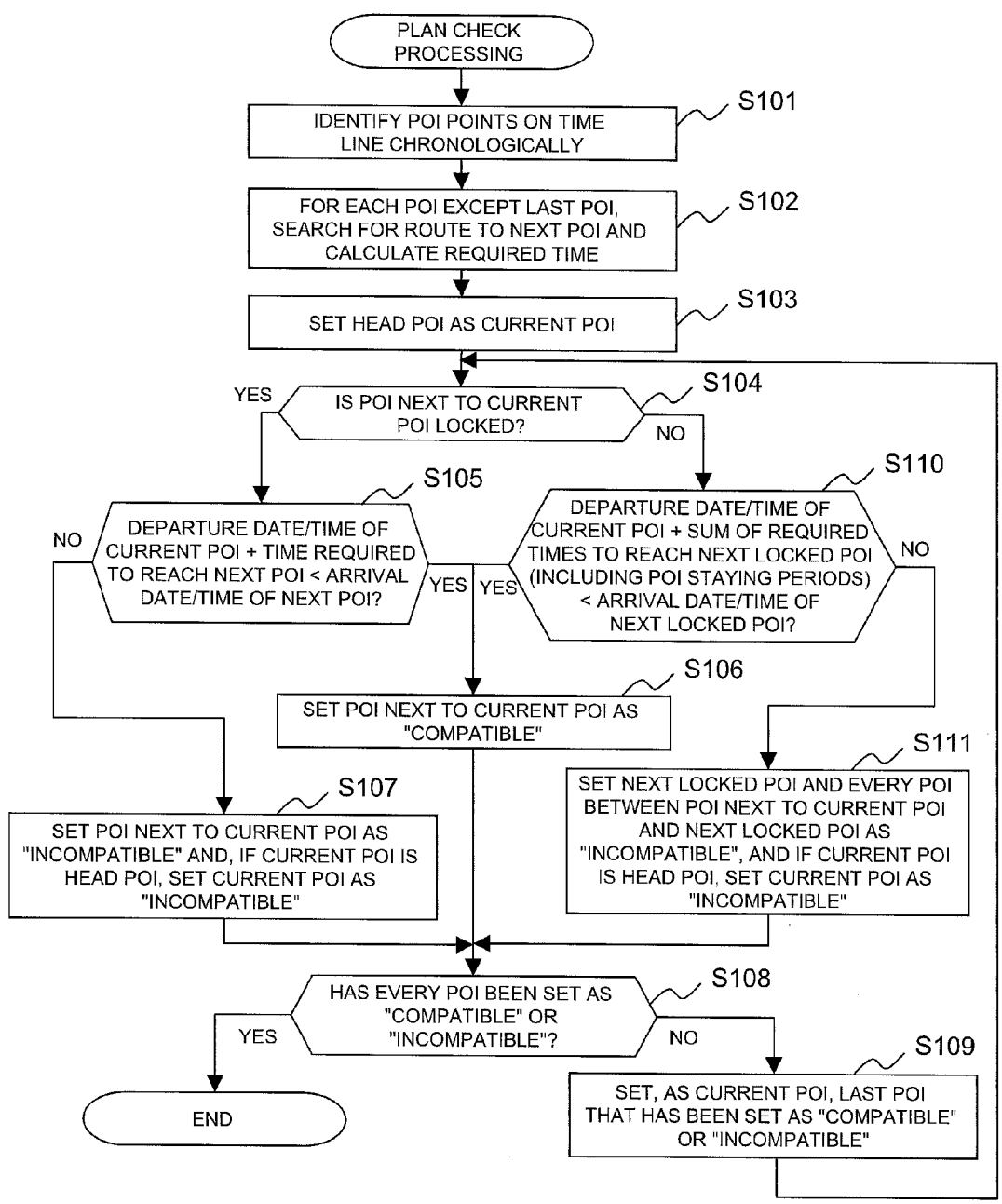
FIG. 9 is a flow chart of plan checking processing.

FIG. 9 is a flow chart illustrating processing details of the plan checking processing executed in Step S006 of the travel plan processing.

The check processing module 107 first identifies POI points chronologically from the placement of POI icons arranged on the time line (Step S101).

The check processing module 107 next searches for a route to the next POI for each POI except the last POI, and calculates the time required to travel the route (Step S102). In this route search, the check processing module 107 requests the main control module 101 to perform, for each POI, processing of searching for a route that has the POI as the departure site and the next POI as the destination. The main control module 101 conducts the search by selecting traffic statistics information appropriate for the departure date/time of the POI and using the traffic statistics information for the route search and the calculation of the required time.

For example, the main control module 101 searches for a route by identifying a link cost that reflects the degree of traffic jam of the date/time of departure from the departure site POI. Alternatively, the main control module 101 searches for a route by identifying a link cost based on the date/time of arrival at a given point along the searched-for route from the departure site POI to the destination POI. In this case, the main control module 101 identifies the degree of traffic jam of, for example, a highway along the route based on a time at which the user gets on the highway, and conducts a route search by Dijkstra's algorithm or the like in a manner that reflects the degree of traffic jam on the cost of a link that constitutes the highway. A more precise route search is thus conducted and the concreteness of a travel plan is enhanced further.

The check processing module 107 next sets, as the current POI, a POI at the head of the travel plan laid out along the time line (Step S103).

The check processing module 107 next determines whether or not a POI next to the current POI is locked (Step S104). Specifically, the check processing module 107 checks whether or not the POI next to the current POI has a value "1" or a larger value as the lock field point on the time line.

In the case where the next POI is locked ("Yes" in Step S104), the check processing module 107 determines whether or not a date/time obtained by adding a length of time that is required for the travel from the current POI to the next POI to the departure date/time of the current POI falls before or on the arrival date/time of the next POI on the time line.

In the case where the obtained date/time falls before or on the arrival date/time of the next POI on the time line ("Yes" in Step S105), the check processing module 107 sets the POI next to the current POI as "compatible", and moves the processing to Step S108 (Step S106).

In the case where the obtained date/time falls after the arrival date/time of the next POI on the time line ("No" in Step S105), the check processing module 107 sets the POI next to the current POI as "incompatible" and, if the current POI is the head POI, sets the current POI as "incompatible" as well. The check processing module 107 then moves the processing to Step S108 (Step S107).

The check processing module 107 next determines whether or not every POI placed on the time line has been set as one of "compatible" and "incompatible" (Step S108). When every POI has been set, the check processing module 107 ends the plan checking processing.

When not every POI has been set ("No" in Step S108), the check processing module 107 sets, as the current POI, the last POI that has been set as one of "compatible" and "incompatible", and returns the control processing to Step S104 (Step S109).

In the case where the POI next to the current POI is not locked, the check processing module 107 determines whether or not a date/time obtained by adding the total time required to reach a next locked POI (if there is a plurality of POI points preceding the next locked POI, the total required time includes the staying periods of the plurality of POI points as well) to the departure date/time of the current POI falls before or on the arrival date/time of the next locked POI (Step S110). In the case where the obtained date/time falls before or on the arrival time ("Yes" in Step S110), the check processing module 107 moves the control processing to Step S106 described above.

In the case where the obtained date/time falls after the arrival date/time ("No" in Step S110), the check processing module 107 sets the next locked POI and all POI points that are included between the current POI and the next locked POI as "incompatible" and, if the current POI is the head POI, also sets the current POI as "incompatible". The check processing module 107 then moves the processing to Step S108 (Step S111).

Specifics of the plan checking processing have been described. By performing the plan checking processing, the navigation device according to the present invention determines with high precision whether or not a drawn-up plan is executable. The navigation device according to the present invention provides information that is helpful particularly to a user who is unfamiliar with the geography around the destination in determining whether or not the plan is practicable, and the user can therefore check the practicability in the planning stage.

Figure 10:
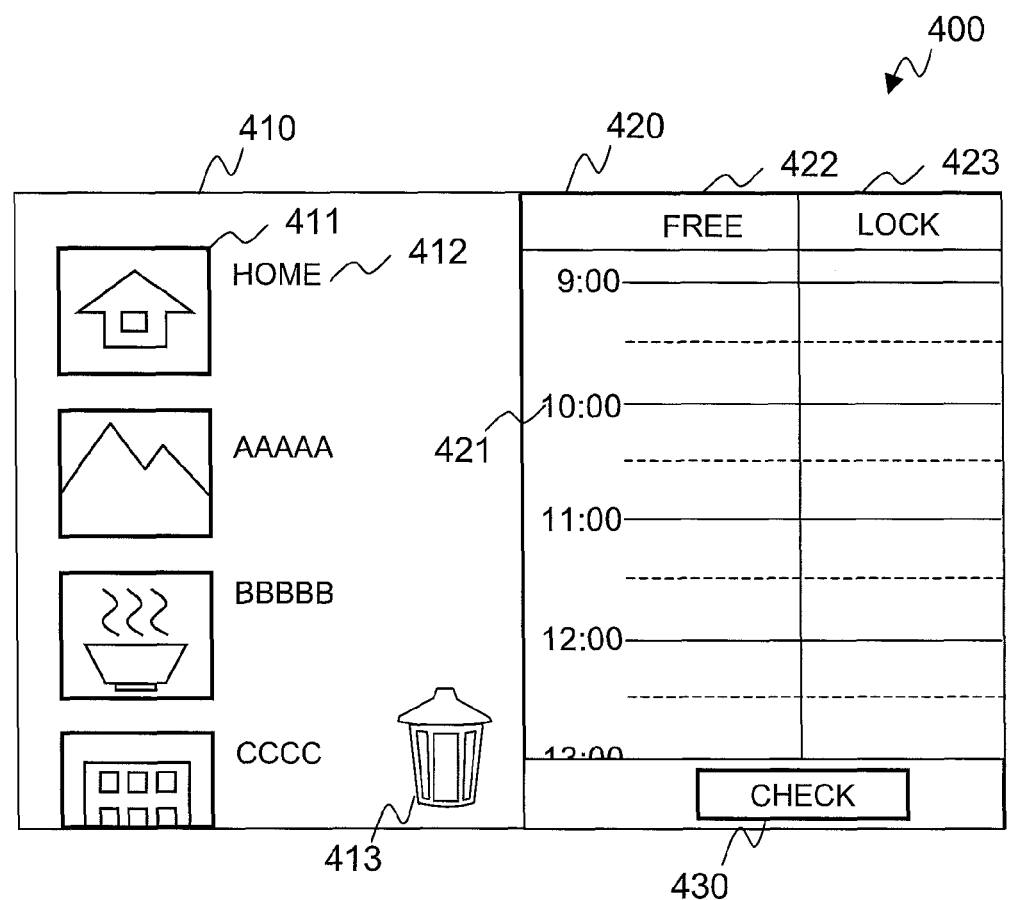
FIG. 10 is a screen display example of the travel plan processing.

FIG. 10 is a diagram illustrating the screen 400 displayed in Step S004 of the travel plan processing. Displayed on the screen 400 are a POI icon display area 410, a time line display area 420, and a check start instruction input area 430.

The POI icon display area 410 displays a plurality of POI icons 411 and display names 412 of POI cards represented by the POI icons 411. The display images of the POI icons 411 are the display images 254 read out of the POI card table 250, and names displayed as the display names 412 are the POI card display names 252 read out of the POI card table 250. The POI icon display area 410 also displays a trash icon 413. The trash icon 413 is an icon having a function of deleting a POI icon that is dropped on top of the trash icon 413. The POI icons 411 displayed in the POI icon display area 410 are sorted in advance by the POI event processing module 106. The POI icons 411 are sorted in, for example, ascending order of distance from the current location of the navigation device. However, once the POI icons 411 are arranged in the time line display area 420, the displayed POI icons 411 are re-sorted by the POI event processing module 106 in the chronological order of the POI icons' placement on the time line.

The time line display area 420 displays time markers 421, which indicate given times that constitute segments of the time line, a free field 422, and a lock field 423. The time markers 421 are displayed in association with, for example, horizontal lines provided at one-hour intervals. The free field 422 and the lock field 423 are fields in which the POI icons 411 are arranged. The free field 422 is a field for designating as a destination the POI icon 411 that has no limitations on arrival time and departure time. The lock field 423 is a field for designating as a destination the POI icon 411 that has limitations on arrival time and departure time. Whichever field the POI icon 411 is placed in, if a staying period is designated, staying at this POI for the designated staying period is treated as a given. In other words, a staying period designated for one POI icon 411 is fixed and is not extended or shortened irrespective of which field the POI icon 411 is placed in. The free field 422 and the lock field 423 are displayed side by side in the lateral direction of the screen, and the time markers 421 are arranged in the top-bottom direction of the screen along the passage of time.

A check button is disposed in the check start instruction input area 430. The check button is a button for receiving an instruction to start the plan checking processing and, receiving the start instruction, the check processing module 107 starts the plan checking processing.

The POI icons 411 displayed in the POI icon display area 410 are aligned in ascending order of distance from the current location in the same direction as the direction of the passage of time indicated by the time markers 421 in the time line display area 420. Displayed in this manner, the POI icons 411 can be arranged in the time line display area by a lateral drag-and-drop operation, which makes it easier to avoid planning a route that is low in travel efficiency, without sacrificing the ease of operation.

Figure 11:
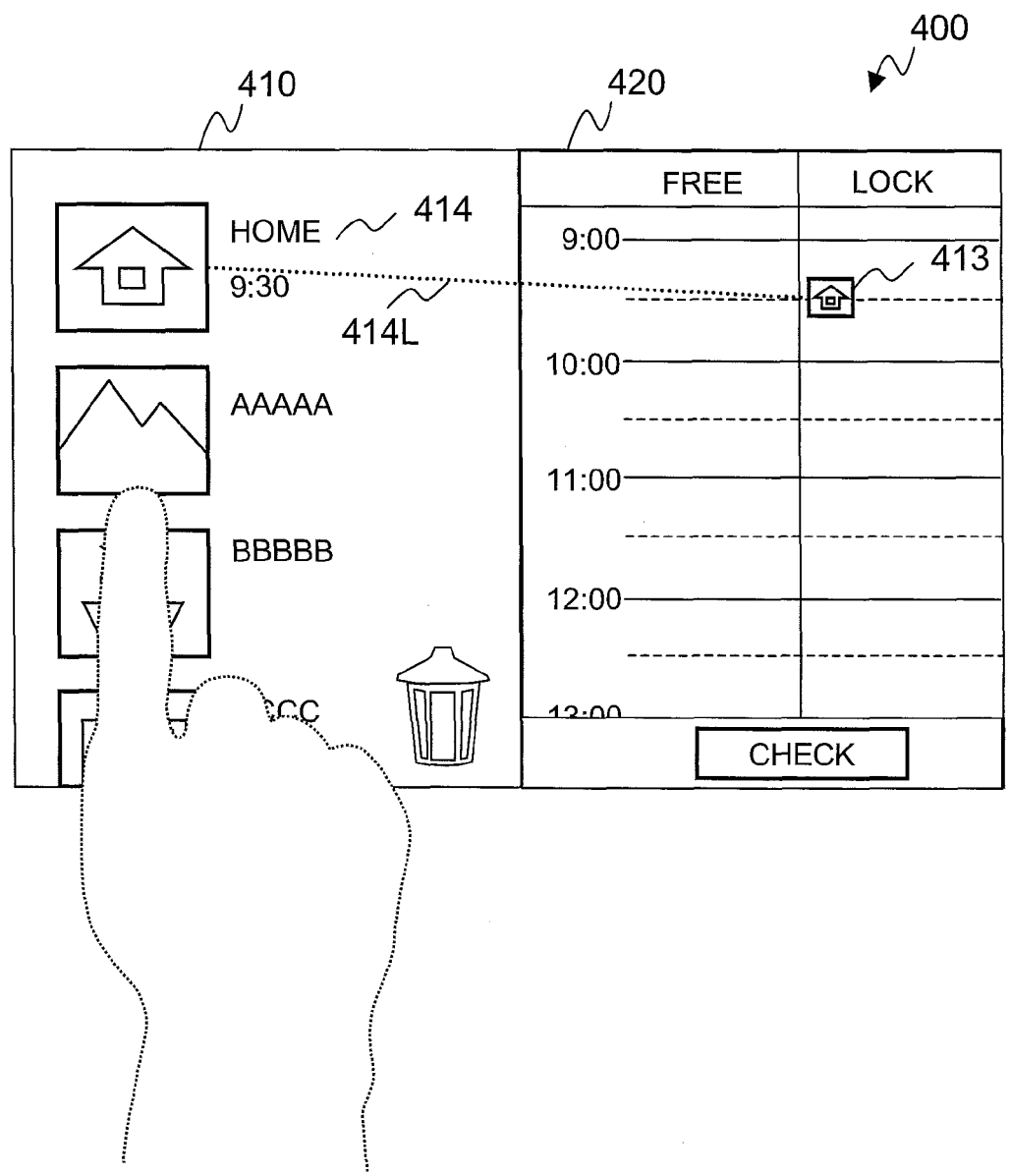
FIG. 11 is another screen display example of the travel plan processing.

FIG. 11 is a diagram illustrating an operation example of the screen 400 displayed in Step S004 of the travel plan processing. FIG. 11 is similar to FIG. 10 in that the POI icon display area 410, the time line display area 420, and the check start instruction input area 430 are displayed on the screen 400. In the screen 400 of FIG. 11, the POI icon 411 that has a display name "HOME" and displayed in the POI icon display area 410 which occupies the left half of the screen 400 in FIG. 10 is placed at a point "9:30" in the lock field 423 of the time line display area 420.

While the POI icon 411 that has a display name "HOME" is placed in the lock field 423, a reduced POI icon 413 that is a reduction of this POI icon 411 is displayed in the time line display area 420. A dotted line 414L links the POI icon 411 and the reduced POI icon 413 to each other to display that "HOME" POI icon 411 and the reduced POI icon 413 are associated with each other. A time at which the POI is placed on the time line ("9:30" in the example above) is further displayed along with the display name of the POI icon 411. The displayed time is, being associated with a time at which the reduced POI icon 413 is placed, changed when there is a change to the placed time. A plurality of POI icons displayed in the POI icon display area 410 are displayed in the chronological order of the POI icons' placement on the time line in the time line display area 420. In other words, the displayed POI icons are aligned in ascending order of placed times on the time line to prevent the dotted line 414L of one POI icon from intersecting with the dotted line 414L of another POI icon.

FIGS. 12(a) and 12(b) are diagrams illustrating another operation example of the screen 400 displayed in Step S004 of the travel plan processing. FIGS. 12(a) and 12(b) are similar to FIG. 10 in that the POI icon display area 410, the time line display area 420, and the check start instruction input area 430 are displayed on the screen 400.

In the screen 400 of FIG. 12(a), a POI icon 415A which is displayed in the POI icon display area 410 and has a display name "BBBBB" is being dragged (moving on the screen while selected). The POI icon 415A is displayed in the same size as that of icons displayed in the POI icon display area 410 while moving through the POI icon display area 410.

In the screen 400 of FIG. 12(b), the POI icon 415A having a display name "BBBBB" which is displayed in the POI icon display area 410 in FIG. 12(a) has been moved and displayed in the time line display area 420. In this situation, the pre-move POI icon 415A is reduced and displayed as a reduced POI icon 416. A POI icon 415B of FIG. 12(b) is for illustrating the size of the pre-move POI icon as a comparison with the change to the icon, and is not illustrated on the actual screen. Displaying a reduced icon in the time line display area 420 in this manner makes it easy for the user to designate a time to the minute in the time line display area.

To make it easy for the user to designate a time to the minute in the time line display area as in FIGS. 12(a) and 12(b), a display method illustrated in FIGS. 13(a) and 13(b) may be employed.

FIGS. 13(a) and 13(b) are diagrams illustrating still another operation example of the screen 400 displayed in Step S004 of the travel plan processing. FIGS. 13(a) and 13(b) are similar to FIG. 10 in that the POI icon display area 410, the time line display area 420, and the check start instruction input area 430 are displayed on the screen 400.

FIGS. 13(a) and 13(b) illustrate a case in which an operation mode different from the one in FIGS. 12(a) and 12(b) is used. In this embodiment, a choice is made between the display method of FIGS. 12(a) and 12(b) and the display method of FIGS. 13(a) and 13(b).

In the screen 400 of FIG. 13(a), as in FIG. 12(a), a POI icon 415A which is displayed in the POI icon display area 410 and has a display name "BBBBB" is being dragged (moving on the screen while selected). The POI icon 415A is displayed in the same size as that of icons displayed in the POI icon display area 410 while moving through the POI icon display area 410.

In the screen 400 of FIG. 13(b), the POI icon 415A having a display name "BBBBB" which is displayed in the POI icon display area 410 in FIG. 13(a) has been moved and displayed in the time line display area 420. In this situation, the pre-move POI icon 415A is displayed without changing the size. Instead, the time axis of the time line display area 420 is displayed enlarged. Placing a POI icon at an objective point in the time line display area is thus made easy without impairing the visibility of the icon.

FIGS. 14(a) and 14(b) illustrate an operation and display in which one of POI icons displayed in the POI icon display area 410 is dropped on top of the trash icon 413, to thereby delete the icon along with its associated icon which has been placed in the time line display area 420.

FIGS. 14(a) and 14(b) are diagrams illustrating yet still another operation example of the screen 400 displayed in Step S004 of the travel plan processing. FIGS. 14(a) and 14(b) are similar to FIG. 10 in that the POI icon display area 410, the time line display area 420, and the check start instruction input area 430 are displayed on the screen 400.

In the screen 400 of FIG. 14(a), a POI icon 417A which is displayed in the POI icon display area 410 and has a display name "HOME" is being dragged (moving on the screen while selected).

In the screen 400 of FIG. 14(b), the POI icon 417A having a display name "HOME" which is displayed in the POI icon display area 410 in FIG. 14(a) has been moved and dropped on the trash icon 413. In this situation, a POI icon 417B which corresponds to the pre-move POI icon 417A is no longer displayed (deleted). A reduced icon 417C which is associated with the POI icon 417B and which has been displayed in the time line display area 420 is no longer displayed (deleted) as well. An icon is deleted not only when a POI icon displayed in the POI icon display area 410 is dropped on the trash icon 413 but also when a reduced icon displayed in the time line display area 420 is dropped on the trash icon 413. In this case, however, the POI icon displayed in the POI icon display area 410 is not deleted.

Figure 15:
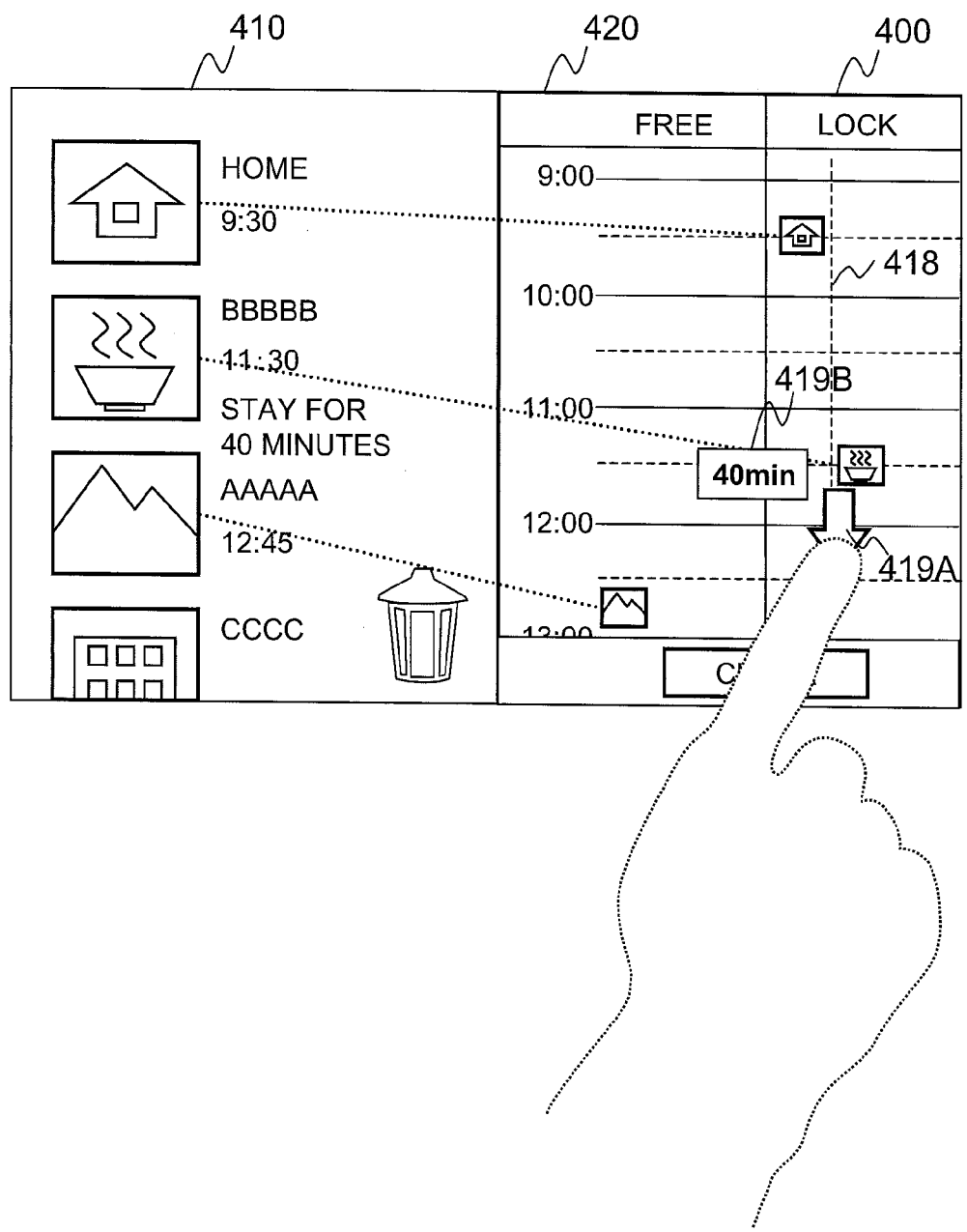
FIG. 15 is a display screen example of the travel plan processing for a case where an icon is touched.

Described next with reference to FIG. 15 is an operation and display for receiving the designation of a staying period for a reduced POI icon which is placed in the time line display area 420.

FIG. 15 is a diagram illustrating yet still another operation example of the screen 400 displayed in Step S004 of the travel plan processing. FIG. 15 is similar to FIG. 10 in that the POI icon display area 410, the time line display area 420, and the check start instruction input area 430 are displayed on the screen 400. A POI icon that has a display name "AAAAA" is placed at a point "12:45" in the free field 422 of the time line display area 420. In the lock field 423 of the time line display area 420, a POI icon that has a display name "HOME" is placed at a point "9:30" and a POI icon that has a display name "BBBBB" is placed at a point "11:30". The "HOME" POI icon and the "BBBBB" POI icon that are displayed in the time line display area 420 are staggered laterally (with the "HOME" POI icon on one side of a line 418, which is not displayed on the screen, and the "BBBBB" POI icon on the other side of the line 418). This is because the lock field point of the "HOME" POI icon has a value "1" whereas the lock field point of the "BBBBB" POI icon has a value "2" and, consequently, the two POI icons are displayed staggered.

When a touch input operation made to the reduced POI icon that has a display name "BBBBB" is received in this state, the POI event processing module 106 displays a handle object 419A for receiving the designation of a staying period, and receives the designation of a staying period. The received designated staying period is displayed in a staying period display area 419B, which is displayed near a POI icon.

FIGS. 16(a) to 16(c) are diagrams illustrating a handle object operation and display for receiving the designation of a staying period. FIG. 16(a) is a display example for a case where a touch input operation made to the reduced POI icon 415A is received. FIG. 16(b) is a diagram illustrating a display example of the screen immediately after the touch input operation is received. The POI event processing module 106 displays the handle object 419A below the reduced POI icon 415A, displays the staying period display area 419B, which uses numbers to display a designated staying period, to the left of the reduced POI icon 415A, and further displays a staying period display bar 419C, which has a length varied in accordance with the staying period to help the user intuitively grasp the designated length of stay, between the reduced POI icon 415A and the handle object 419A. When a drag operation that drags the handle object 419A downward is received, the POI event processing module 106 identifies the length of the staying period based on the amount of the drag operation, and makes the identified length reflected on the staying period display area 419B and on the displayed length of the staying period display bar 419C (by extending the bar length).

As illustrated in FIG. 16(c), when a touch input of a touch to the reduced POI icon 415A is received in FIG. 16(a), the POI event processing module 107 displays a handle object 419E above the reduced POI icon 415A, and displays a staying period display bar 419D, which has a length varied in accordance with the staying period to help the user intuitively grasp the designated length of stay, between the reduced POI icon 415A and the handle object 419E. When a drag operation that drags the handle object 419E upward is received, the POI event processing module 106 identifies the length of the staying period based on the amount of the drag operation, and makes the identified length reflected on the staying period display area 419B and on the displayed length of the staying period display bar 419D (by extending the bar length). The staying period display area 419B displays a total staying period which is the sum of the staying period received by way of the handle object 419A and the staying period received by way of the handle object 419E.

Figure 17:
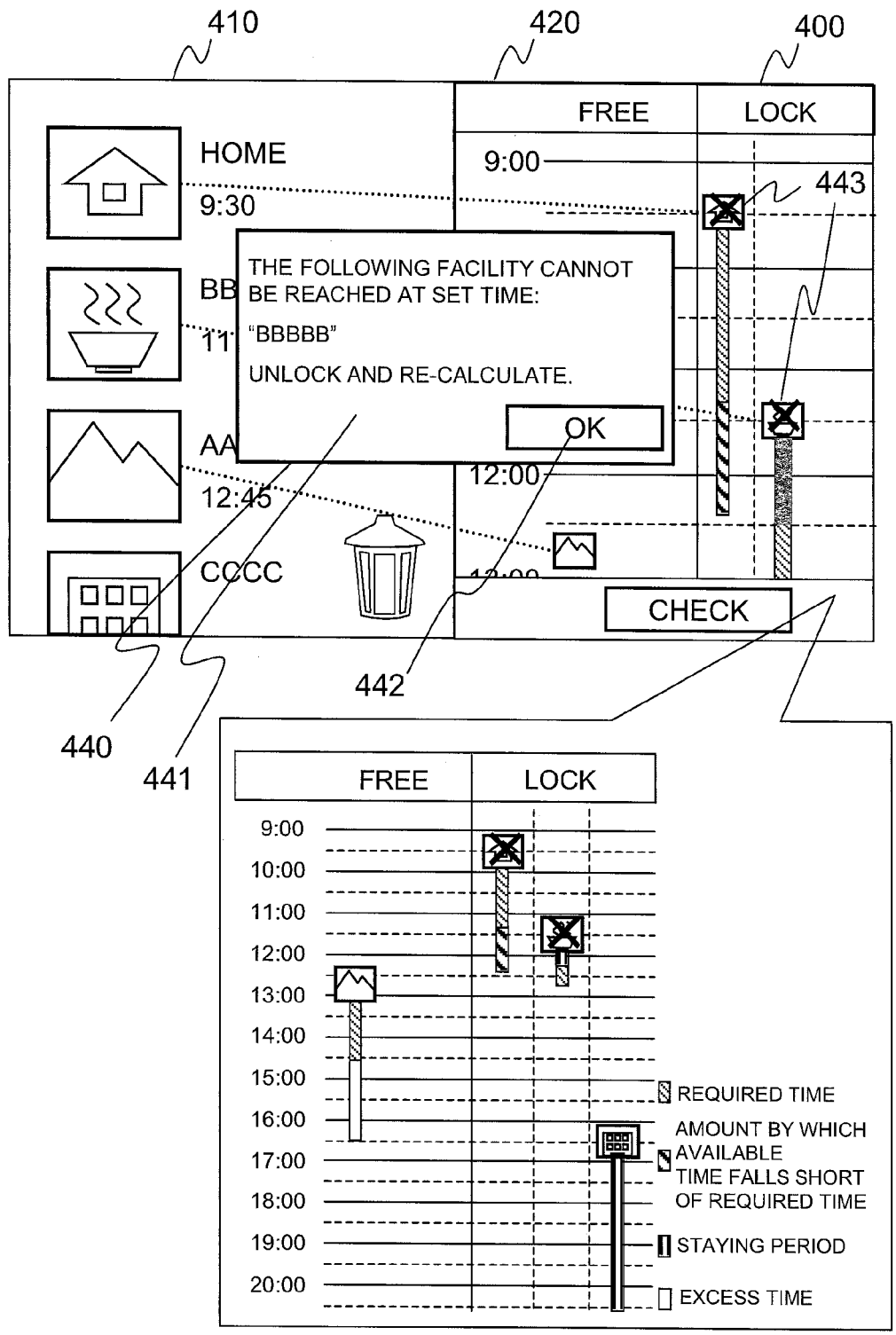
FIG. 17 is a display screen example of a result of checking a plan of the travel plan processing.

FIG. 17 is a diagram illustrating an example of the screen 400 that is displayed when an incompatible POI icon is found as a result of the plan check processing. FIG. 17 is similar to FIG. 10 in that the POI icon display area 410, the time line display area 420, and the check start instruction input area 430 are displayed on the screen 400.

In FIG. 17, a pop-up message display area 440 for informing the user of the presence of a POI icon determined as "incompatible" is superimposed on the screen 400. The pop-up message display area 440 displays a message 441, which points out that there is an incompatible POI icon, and an OK button 442, which is for receiving a message confirmation operation from the user. The message 441 reads as, for example, "Arriving at the following facility at the set time is not possible. (line feed) "BBBBB" (line feed) Unlock and re-calculate." In addition, a "x" mark 443 which indicates that a POI icon is incompatible is displayed in association with the incompatible POI icon or the like.

Figure 18:
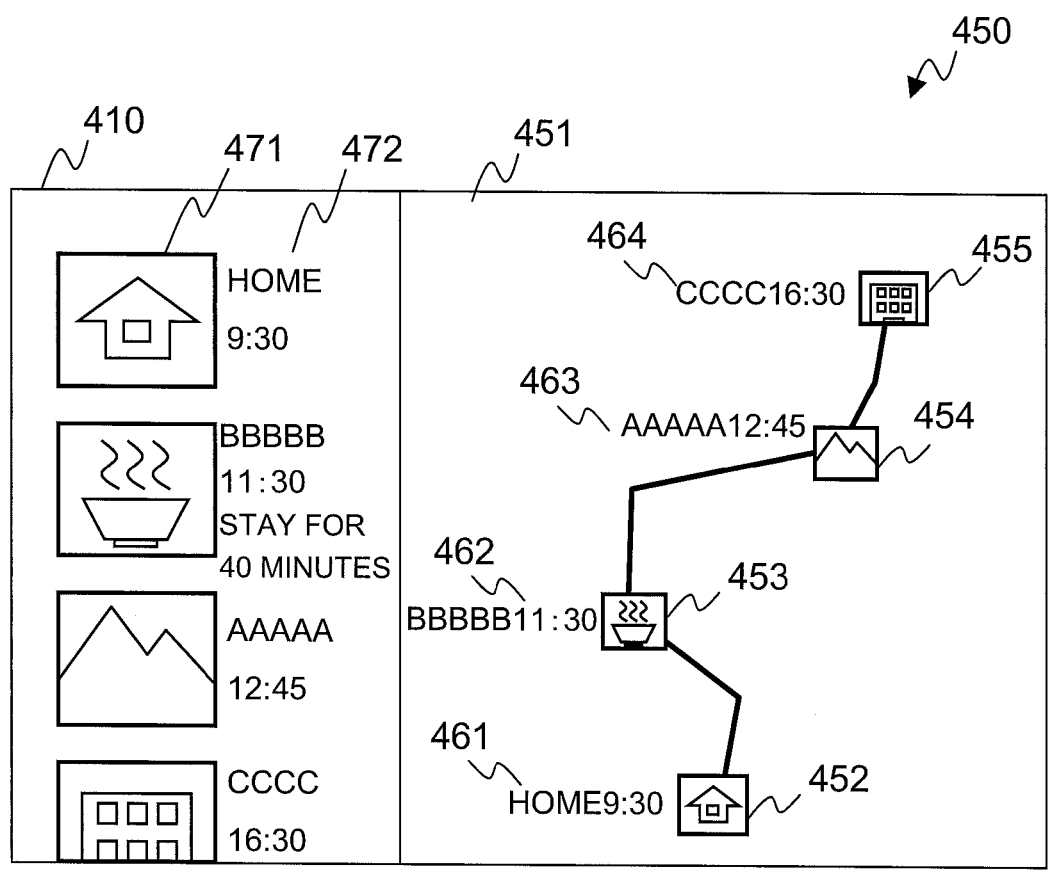
FIG. 18 is still another screen display example of the travel plan processing.

FIG. 18 is a diagram illustrating an example of a travel plan check screen 450 which is displayed in Step S008 when a plan is found to be free of problems (i.e., when any of the POI icons arranged on the time line is determined as "compatible") as a result of the travel plan processing. Route information which high-lights the route on a map is displayed in a route information display area 451 on the right-hand side of the travel plan check screen 450. The displayed route information includes a "HOME" POI icon 452 and its departure time 461, a "BBBBB" POI icon 453 and its arrival time 462, an "AAAAA" POI icon 454 and its arrival time 463, and a "CCCCC" POI icon 455 and its arrival time 464 which are placed on the time line 420.

POI icons 471 are displayed on the left-hand side of the screen as in the POI icon display area 410 of FIG. 10. A POI icon description 472 (including a display name, an arrival time, and a staying period) is displayed around each of the POI icons.

Figure 19:
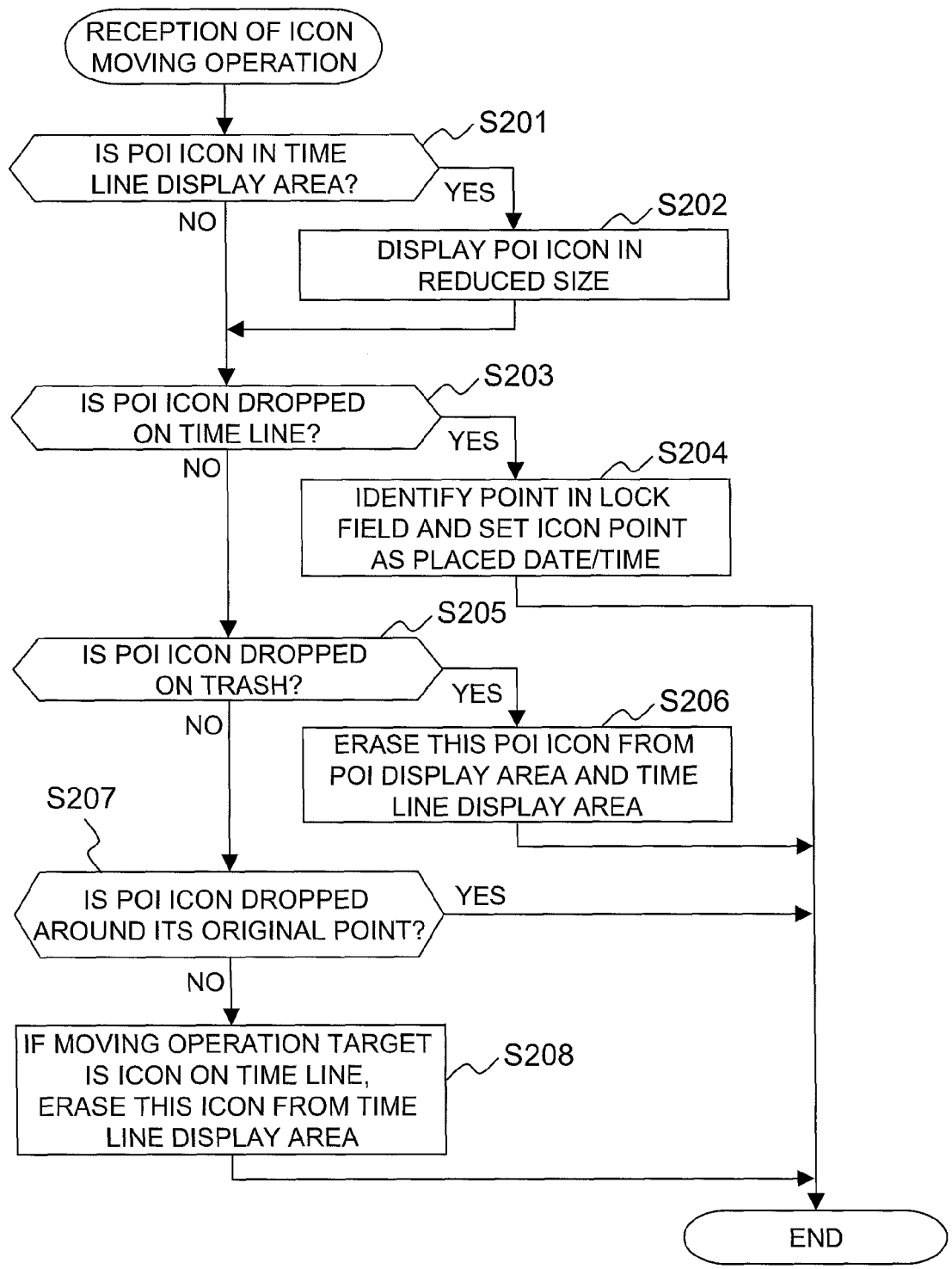
FIG. 19 is a flowchart of icon operation receiving processing.

FIG. 19 is a diagram illustrating the flow of processing for receiving a POI icon moving operation when a time line operation input is received in Step S004 of the travel plan processing.

First, the POI event processing module 106 determines whether or not the moved POI icon is located in the time line display area (Step S201). In the case where the moved POI icon is not in the time line display area ("No" in Step S201), the POI event processing module 106 moves the processing to Step S203.

In the case where the moved POI icon is in the time line display area ("Yes" in Step S201), the POI event processing module 106 displays the POI icon in a reduced display size (Step S202). Specifically, the POI event processing module 106 displays the POI icon reduced to the same size as that of the reduced POI icon 413 of FIG. 11.

The POI event processing module 106 next determines whether or not the POI icon has been dropped on the time line (Step S203). Specifically, the POI event processing module 106 determines whether or not the moved POI icon has been dropped in the free field 422 or lock field 423 of the time line display area 420. In the case where the moved POI icon has not been dropped on the time line ("No" in Step S203), the POI event processing module 106 moves the processing to Step S205.

In the case where the moved POI icon has been dropped on the time line ("Yes" in Step S203), the POI event processing module 106 identifies a point in the lock field at which the POI icon has been dropped, and recognizes a date/time that corresponds to the icon point as a placed date/time (Step S204). Specifically, the POI event processing module 106 identifies which of "0" (the free field), "1", "2", and "3" is the value of the point in the lock field at which the POI icon has been dropped, recognizes a date/time that corresponds to the icon point as a placed date/time, and stores the icon point and the placed date/time as the lock field point 303 and the placed date/time 302, respectively, in the input information table 300. The POI event processing module 106 assigns values "1", "2", and "3" to other lock field points than "0" in ascending order of placed dates/times of the POI icons placed in the lock field 423. If more than three POI icons are placed in the lock field 423, the value of a lock field point is identified based on the order in which the assigned values are repeated: "1", "2", "3", "2", "1", "2", "3", "2" . . . . The value of a lock field point may also be identified based on a different repetition order: "1", "2", "3", "1", "2", "3", "1" . . . . The POI event processing module 106 then ends the icon moving operation receiving processing.

Next, the POI event processing module 106 determines whether or not the POI icon has been dropped on the trash (Step S205). Specifically, the POI event processing module 106 determines whether or not the point at which the moved POI icon has been dropped at least partially overlaps with the trash icon 413. In the case where the POI icon has not been dropped on the trash ("No" in Step S205), the POI event processing module 106 moves the processing to Step S207.

In the case where the POI icon has been dropped on the trash ("Yes" in Step S205), the POI event processing module 106 erases the POI icon from the screen by deleting the POI icon that is displayed in the POI display area and the POI icon that is displayed in the time line display area as illustrated in FIGS. 14(a) and 14(b) (Step S206). The POI event processing module 106 then ends the icon moving operation receiving processing.

The POI event processing module 106 next determines whether or not the POI icon has been dropped around its original point (Step S207). Specifically, the POI event processing module 106 determines whether or not the point at which the moved POI icon has been dropped at least partially overlaps with the original POI icon. In the case where the moved POI icon has been dropped on the original POI icon ("Yes" in Step S207), the POI event processing module 106 ends the icon moving operation receiving processing.

In the case where the moved POI icon has not been dropped on the original POI icon ("No" in Step S207), the POI event processing module 106 deletes the POI icon placed in the time line display area if the moved POI icon is an icon placed on the time line (Step S208). The POI event processing module 106 then ends the icon moving operation receiving processing.

Specifics of the icon moving operation receiving processing have been described. Through the icon moving operation receiving processing, event editing processing that is suited to where a POI icon is moved to is performed.

Figure 20:
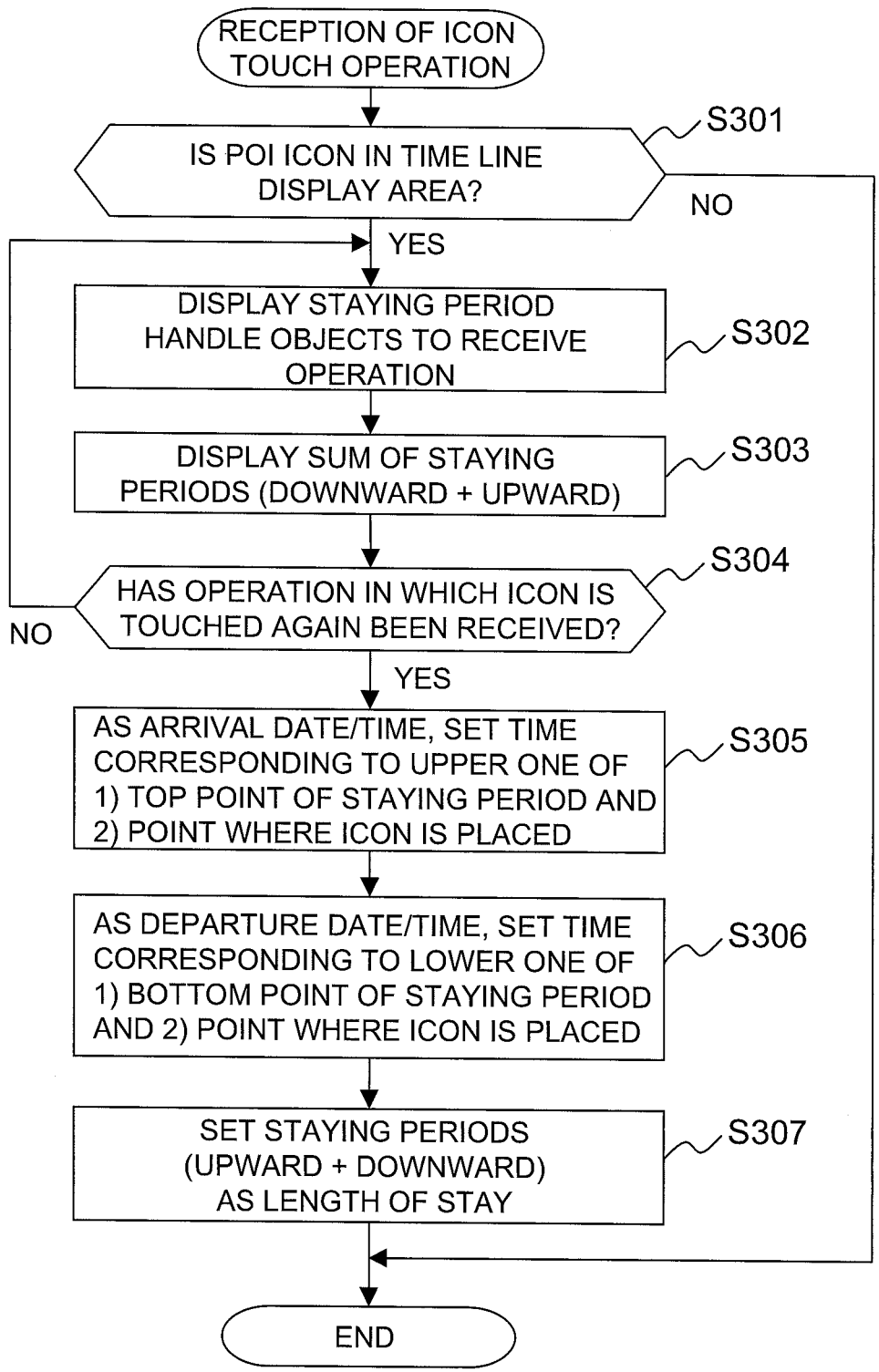
FIG. 20 is a flow chart of icon touch operation receiving processing.

FIG. 20 is a diagram illustrating processing specifics of icon touch operation receiving processing for performing editing processing that is suited to what touch operation is made to a POI icon.

First, the POI event processing module 106 determines whether or not the touched POI icon is a POI icon placed in the time line display area (Step S301). In the case where the touched POI icon is not a POI icon placed in the time line display area ("No" in Step S301), the POI event processing module 106 ends the icon touch operation receiving processing.

In the case where the touched POI icon is a POI icon placed in the time line display area ("Yes" in Step S301), the POI event processing module 106 displays the handle objects for designating a staying period as illustrated in FIGS. 16(a) to 16(c), and receives an operation (Step S302).

The POI event processing module 106 next displays the sum of staying periods that are designated by the operation received in Step S302 (Step S303). Specifically, the POI event processing module 106 displays, in the staying period display area 419B of FIG. 16(c), a staying period equivalent to the sum of the amount of a downward handle object operation received in Step S302 and the amount of an upward handle object operation received in Step S302.

The POI event processing module 106 next determines whether or not a touch input of a touch to this POI icon has been received again (Step S304). In the case where the touch input has been received again ("Yes" in Step S304), the POI event processing module 106 returns the processing to Step S302.

In the case where the touch input has not been received again ("No" in Step S304), the POI event processing module 106 sets, as the time of arrival at this POI, a time corresponding to the upper one of 1) a point for which a staying period has been designated via the upward handle object and 2) a point on the time line at which the POI icon is placed, and stores as the arrival date/time 304 of the input information table 300 (Step S305).

The POI event processing module 106 next sets, as a departure time at which the user departs this POI, a time corresponding to the lower one of 1) a point for which a staying period has been designated via the downward handle object and 2) a point on the time line at which the POI icon is placed, and stores as the departure date/time 306 of the input information table 300 (Step S306).

The POI event processing module next sets, as a period in which the user stays at this POI, a length of time equivalent to the difference between the arrival time and the departure time, and stores as the staying period 305 of the input information table 300 (Step S307). The POI event processing module 106 then ends the icon touch operation receiving processing.

By receiving an icon touch operation in this manner, the designation of detailed settings of a placed POI icon is received interactively.

The first embodiment of the present invention has now been described.

According to the first embodiment of the present invention, the navigation device 100 can assist the user in drawing up a travel plan that includes visiting a plurality of destinations. In other words, the user can draw up an adequate plan for traveling around places in an unfamiliar region.

While the plan check processing of the first embodiment determines whether a plan is adequate or not, the present invention is not limited thereto and the navigation device 100 may instead correct an incompatible part of the plan and advise the user on how to adjust the plan. This includes showing the user how much the departure time should be moved backward and giving the user an indication of how much the arrival time should be moved forward. This way, the navigation device 100 can give the user a hint on what adjustment is to be made to turn an inadequate plan into an adequate plan, and improves the convenience of the user even more.

The present invention is not limited to the first embodiment described above. Various modifications can be made to the first embodiment within the technical concept of the present invention. For example, while the travel plan processing of the first embodiment uses an algorithm that is included in advance in the navigation device 100 to search for a route and calculate a required time, the navigation device 100 may request a not-shown external organization that provides a route search service to search for a route and calculate a required time. This way, a more precise plan can be drawn up.

A second embodiment of the present invention is described next. The navigation device 100 in the second embodiment has a configuration that is almost the same as the one in the first embodiment described above but slightly differs, and exerts different functions. The following description focuses on the differences.

The navigation device 100 in the second embodiment has the POI card table 250 that is substantially the same as the POI card table 250 in the first embodiment, except that the POI card table 250 in the second embodiment has items in addition to those of the POI card table 250 in the first embodiment. Specifically, the POI card table 250 in the second embodiment has an additional item, a staying period 255, plus the items of the POI card table 250 in the first embodiment as illustrated in FIG. 21. The POI card stored in the POI card table 250 stores a record for each POI and a length of stay at the POI is stored as the staying period 255. The length of stay stored as the staying period 255 of a POI card is designated by the creator of this POI card at the time of creation. The staying period 255 therefore is the actual length of stay at the POI in some cases, a scheduled length of stay in other cases, and an estimated length of stay in still other cases.

The computing unit 1 of the navigation device 100 in the second embodiment further includes a plan adjustment processing module 108. The plan adjustment processing module 108 is a processing module that manages the predicted progress and the actual progress after the vehicle starts driving following a travel plan and, if an adjustment is needed such as when there is a significant deviation from the plan, performs processing of editing the travel plan.

The navigation device 100 in the second embodiment performs modification suggestion processing after the vehicle starts driving to suggest a modification to the travel plan based on the vehicle's location, driving state, and the like. The modification suggestion processing performed by the navigation device 100 in the second embodiment is described with reference to FIG. 22. The modification suggestion processing is executed by the plan adjustment processing module 108 by controlling other processing modules.

Figure 22:
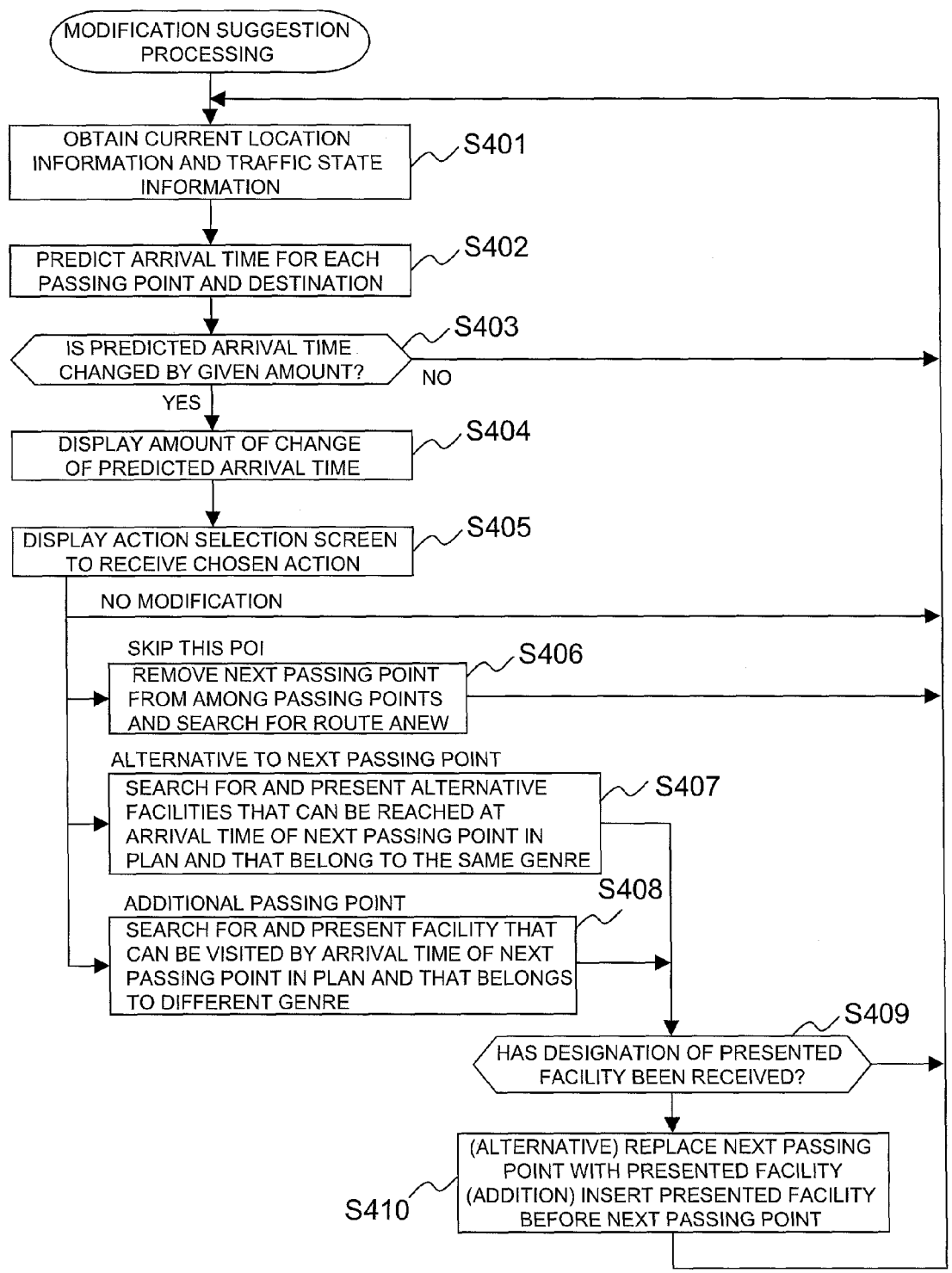
FIG. 22 is a flow chart of travel plan modification suggestion processing.

FIG. 22 is a diagram illustrating the processing flow of the modification suggestion processing. The modification suggestion processing is started when the vehicle starts driving in accordance with a travel plan planned in the travel plan processing.

First, the plan adjustment processing module 108 obtains current location information and traffic state information (Step S401). Specifically, the plan adjustment processing module 108 requests the main control module 101 to provide current location information, namely, information for identifying the coordinates of the current location, and traffic state information such as information about a traffic jam along the planned route. The main control module 101 hands over, as the traffic state information, latest traffic information obtained through VICS or the like.

The plan adjustment processing module 108 next predicts the time of arrival at each passing point and the destination (Step S402). Specifically, the plan adjustment processing module 108 calculates a required time for each passing point with the use of the traffic state information and route information, and predicts the arrival time by adding an accumulation of required times to the current time. The plan adjustment processing module 108 also predicts the time of arrival at the destination via the passing points in the same manner.

The plan adjustment processing module 108 then determines for each passing point and the destination whether or not there is a given change in the predicted arrival time (Step S403). Specifically, for each time of arrival at a passing point or the destination that is predicted in Step S402, the plan adjustment processing module 108 compares the predicted arrival time with a past prediction of the arrival time of the passing point or destination. In the case where the predicted arrival time is later or earlier than the previous prediction of arrival time by a given amount of time (for example, thirty minutes) or more, the plan adjustment processing module 108 determines that there is a given change. In the case where there is not a given change, the plan adjustment processing module 108 returns the control processing to Step S401.

In the case where there is a given change ("Yes" in Step S403), the plan adjustment processing module 108 displays the amount of change in the predicted arrival time (Step S404). Specifically, the plan adjustment processing module 108 constructs a screen illustrated in FIG. 23 and requests the output processing module 103 to output the screen to the display 2.

Figure 23:
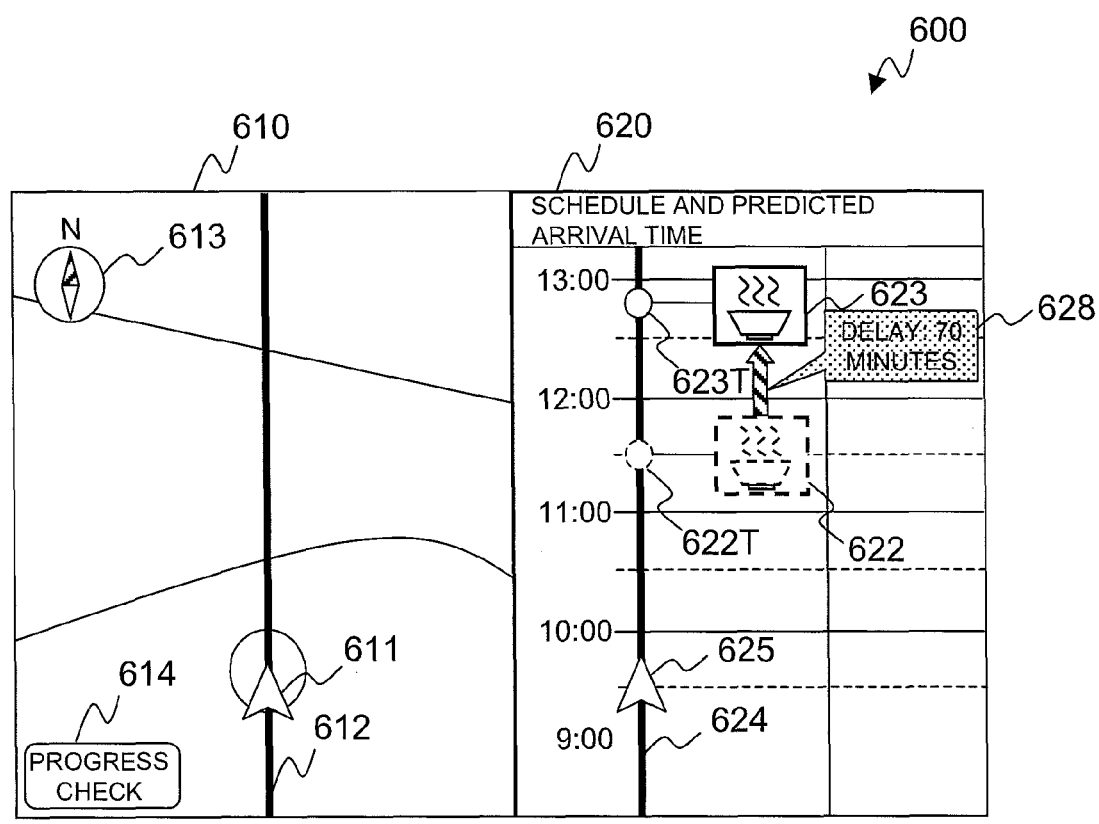
FIG. 23 is a screen display example of the modification suggestion processing for a case where there is a delay to the plan.

FIG. 23 is an example of a delay display screen 600 which is displayed in Step S404 when it is determined in Step S403 that there is a given delay or more. The delay display screen 600 is a screen for displaying information on a delay of a predicted time of arrival at a passing point or the destination from the previous prediction of arrival time. A half map display area 610 and a time line display area 620 are displayed on the delay display screen 600.

Displayed in the half map display area 610 are a car mark 611, which indicates the current location of the navigation device 100, a guided route 612, a direction image 613, which indicates the direction, and a progress check button 614, which is for receiving an instruction to check the progress. The car mark 611 is superimposed on a map of the surroundings of the current location. The route 612 is a route searched for based on a travel plan. The direction image 613 is an image that shows the north, south, east, and west directions and has an appearance designed after, for example, a compass. The progress check button 614 is for receiving an instruction to output the current delay status in an audio form. When an input from the progress check button 614 is received, the plan adjustment processing module 108 generates audio information based on the amount of delay that is identified in Step S403, for example, information indicating the length of delay, and requests the output processing module 103 to output the audio information from the speaker 42.

In the time line display area 620, time markers 624, which indicate given times that constitute segments of the time line are displayed. The time markers 624 are displayed in association with, for example, horizontal lines provided at one-hour intervals. At the time marker 624 that corresponds to the current time, a car mark icon 625 which indicates the current time is displayed. At the time markers 624 that correspond to given times, marks 622T and 623T are placed to give an indication to scheduled or predicted times of arrival at passing points 622 and 623. The difference between the scheduled time of arrival and the predicted time of arrival at the passing point 622, namely, the length of delay from the scheduled arrival time, is displayed in a delay amount display area 628. The time markers 624 are arranged in the top-bottom direction of the screen along the passage of time. An example of the delay display screen 600 has been described. The delay display screen 600 is not limited to this configuration and may instead be a screen 700 of a modification example described later.

Figure 24:
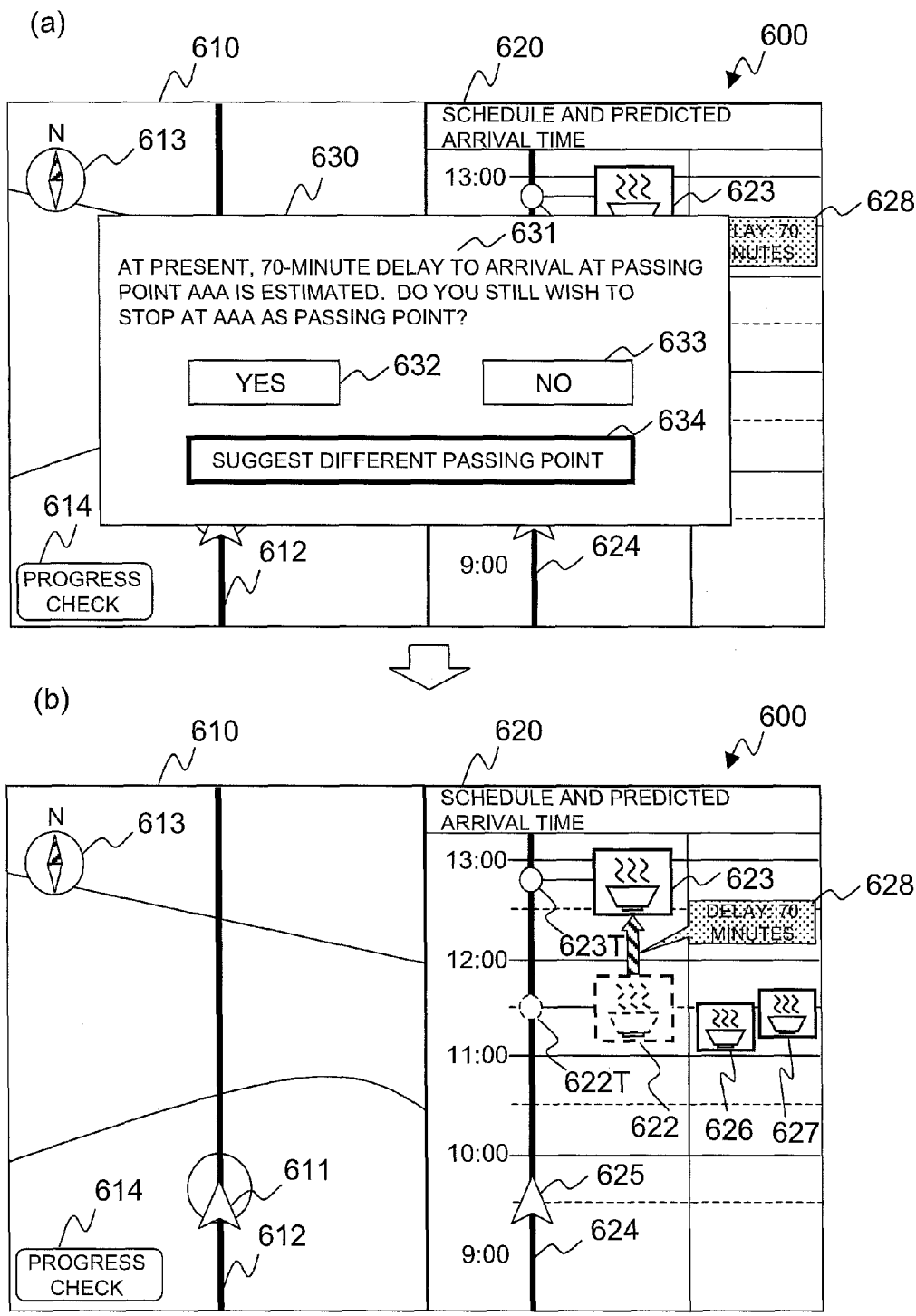
FIGS. 24(a) and 24(b) are a screen display example of the modification suggestion processing for a case where passing points are switched (throughout this application, the term "passing point" is intended to refer to a point at which a brief stop is to be made).

Returning to the description of the flow, the plan adjustment processing module 108 displays an action selection screen to receive a choice of action (Step S405). Specifically, the plan adjustment processing module 108 requests the output processing module 103 to display on the delay display screen 600 a message area 630 for prompting the user to choose how to deal with a delay and receiving the choice as illustrated in FIG. 24(*a*). Receiving the choice, the plan adjustment processing module 108 determines subsequent processing based on the received choice.

FIG. 24(*a*) is a display example for displaying selections for how to deal with a delay and receiving a choice on the delay display screen 600. FIG. 24(*a*) illustrates an example of the message display area 630 for receiving the input of a chosen action against a delay. A message 631 is displayed in the message display area 630 to inform the user of the amount of delay in reaching the next passing point and to ask the user to determine whether to stick to the plan of stopping at this passing point. Also displayed in the message display area 630 are a "Yes" button 632 for giving a positive response to the message, a "No" button 633 for giving a negative response, and a "suggest a different passing point" button 634 for giving another response which is an instruction to switch to a different passing point.

When the input receiving module 102 receives an input via the "Yes" button 632, the plan adjustment processing module 108 determines that the user has chosen to stick to the plan of stopping at the passing point, in other words, stopping at the passing point is not to be changed, and returns the control processing to Step S401.

When the input receiving module 102 receives an input via the "No" button 633, the plan adjustment processing module 108 determines that the user has chosen not to stick to the plan of stopping at the passing point, in other words, the passing point is to be skipped, and searches for a route anew after removing the next passing point from among the scheduled passing points (Step S406). Specifically, the plan adjustment processing module 108 requests the main control module 101 to search for a route anew and provide route guidance. The plan adjustment processing module 108 then returns the control processing to Step S401.

When the input receiving module 102 receives an input via the "suggest a different passing point" button 634, the plan adjustment processing module 108 determines that the user has chosen to stop at an alternative passing point, in other words, the passing point is to be replaced, searches for an alternative facility through which the user can arrive at the next passing point in the plan at the scheduled arrival time, and presents the alternative facility in the time line display area 620 as illustrated in FIG. 24(*b*) (Step S407). FIG. 24(*b*) illustrates an example in which a first alternative facility 626 and a second alternative facility 627 have been found through the search and are displayed. Each of the alternative facilities 626 and 627 can be designated in a received instruction. An alternative facility is a facility that belongs to the same genre as that of the next passing point and that does not cause a delay for the subsequent plan when 1) the length of drive along a route to this alternative facility, 2) the length of drive along a route from the alternative facility to a passing point that is next to the next passing point, or to the destination, and 3) the length of stay at this alternative facility, namely, information stored as the staying period 255 in the POI card table 250, are accumulated.

FIGS. 25(*a*) and 25(*b*) are an example of an early arrival display screen 600 which is displayed when it is determined in Step S403 that the arrival is earlier by a given amount or more. The early arrival display screen 600 is a screen for displaying information on an early arrival when the predicted time of arrival at a passing point or the destination is earlier than the previous prediction of arrival time. The half map display area 610 and the time line display area 620 are displayed on the early arrival display screen 600 as on the delay display screen 600. An example of the early arrival display screen 600 has been described. The early arrival display screen 600 is not limited to this configuration and may instead be the screen 700 of a modification example described later.

FIG. 25(a) is a display example for displaying selections for how to deal with an early arrival and receiving a choice on the early arrival display screen 600. FIG. 25(a) illustrates an example of a message display area 640 for receiving the input of a chosen action against an early arrival. A message 641 is displayed in the message display area 640 to inform the user of an amount of time that indicates how much the arrival at the next passing point is ahead of the previous prediction of arrival time, and to ask the user to determine whether to stop at another facility on the way to this passing point. Also displayed in the message display area 640 are a "Yes" button 642 for giving a positive response to the message and a "No" button 643 for giving a negative response.

On the early arrival display screen 600 of the FIGS. 25(a) and 25(b), the time markers 624, which indicate given times that constitute segments of the time line, are displayed in the time line display area 620. The time markers 624 are displayed in association with, for example, horizontal lines provided at one-hour intervals. At a point on the time marker 624 that corresponds to the current time, the car mark icon 625 which indicates the current time is displayed. At points on the time markers 624 that correspond to given times, marks 651T and 652T are placed to give an indication to scheduled or predicted times of arrival at passing points 651 and 652. The difference between the scheduled time of arrival and the predicted time of arrival at the passing point 651, namely, the length of time by which the arrival is ahead of schedule, is displayed in an early arrival amount display area 653. The half map display area 610 of FIGS. 25(a) and 25(b) has the same display configuration as that of the half map display area illustrated in FIGS. 24(a) and 24(b).

When the input receiving module 102 receives an input via the "No" button 643, the plan adjustment processing module 108 determines that the user has chosen to stick to the plan of stopping at the passing point, in other words, stopping at the passing point is not to be changed, and returns control processing to Step S401.

When the input receiving module 102 receives an input via the "Yes" button 642 of FIG. 25(a), the plan adjustment processing module 108 determines that the user has chosen to stop at an additional passing point, in other words, a passing point is to be added, searches for facilities that the user can stop at before the time of arrival at the next passing point in the plan, and presents the facilities in the time line display area 620 as illustrated in FIG. 25(b) (Step S408). The presented facilities, such as a first addition candidate facility 654 and a second addition candidate facility 655 which are illustrated in FIG. 25(b), are placed near their associated time markers in the time line display area 620 as icons that can be selected. Each of the first addition candidate facility 654 and the second addition candidate facility 655 can be designated in a received instruction. An addition candidate facility is a facility that belongs to a different genre from that of the next passing point, and that does not cause a delay to the arrival plan for the next and subsequent passing points when 1) the length of drive along a route to the addition candidate facility, 2) the length of drive along a route from the addition candidate facility to the next passing point, or to the destination, and 3) the length of stay at this addition candidate facility, namely, information stored as the staying period 255 in the POI card table 250 are accumulated.

Next, the plan adjustment processing module 108 determines whether or not the designation of a presented facility has been received (Step S409). Specifically, if there is a delay to the travel plan, the plan adjustment processing module 108 determines whether or not an instruction to choose one of the alternative facilities to stop at has been received. If there is an arrival earlier than scheduled in the travel plan, the plan adjustment processing module 108 determines whether or not an instruction to choose one of the addition candidate facilities to stop at has been received. In the case where the designation of a presented facility has not been received, the plan adjustment processing module 108 returns the control processing to Step S401.

In the case where the designation of a presented facility has been received and the facility designated in Step S409 is an alternative facility, the plan adjustment processing module 108 replaces the next passing point with the presented facility designated. In the case where the designated facility in Step S409 is an addition candidate facility, the plan adjustment processing module 108 inserts the presented facility designated in the plan before the next passing point (Step S409). The plan adjustment processing module 108 then requests the main control module 101 to search for a route once more and returns the control processing to Step S401.

Figure 26:
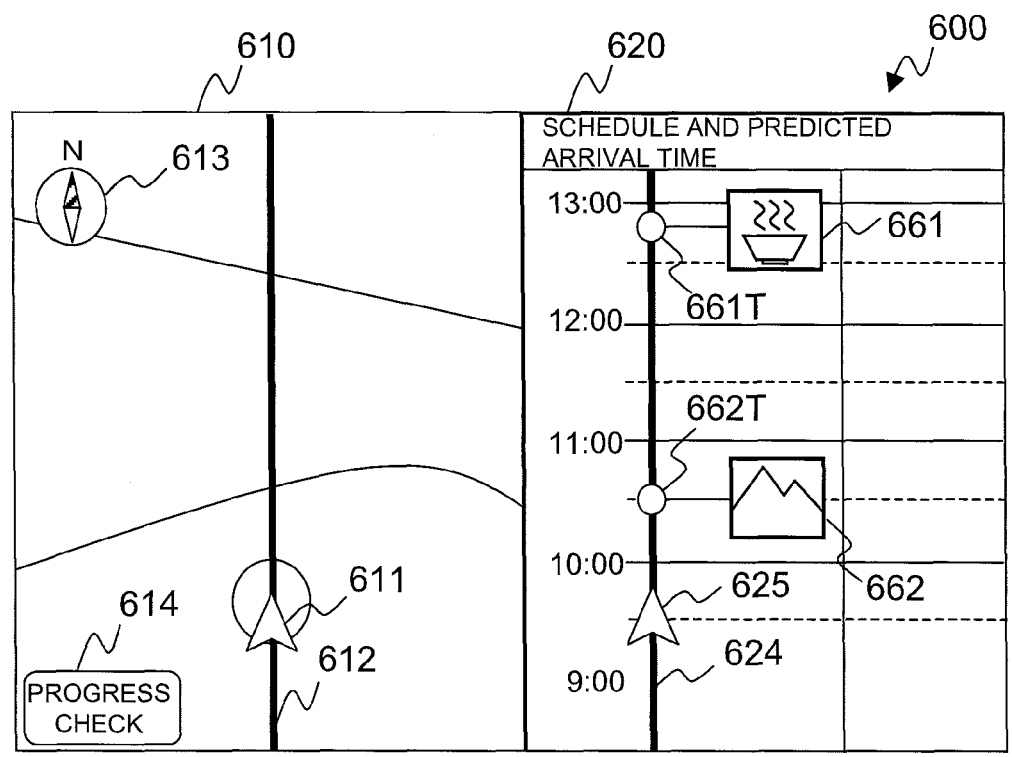
FIG. 26 is a screen display example of the modification suggestion processing for a case where a stop is added.

In the case where the designated facility is an addition candidate facility, the plan adjustment processing module 108 instructs the output processing module 103 to output the screen 600 that is illustrated in FIG. 26 until the control processing is returned to Step S401.

FIG. 26 is a diagram illustrating a screen that is displayed when the input receiving module 102 receives an instruction to choose one of the addition candidate facilities presented in FIG. 25(b). In this screen 600, an additional facility 662 chosen in the received instruction is placed in the time line display area 620, and the additional facility 662 is displayed in association with a mark 662T which corresponds to the time of arrival at the facility. The plan adjustment processing module 108 constructs a screen by displaying a next destination 661 at which the user has been expected to arrive earlier than scheduled in association with a mark 661T which corresponds to the original arrival time, and by disabling the display of the early arrival amount display area.

The processing flow of the modification suggestion processing has been described. According to the modification suggestion processing described above, if the prediction of the time of arrival at a passing point or the destination is expected to be changed greatly while the navigation device 100 is giving route guidance information following a travel plan, the navigation device 100 can suggest the user to delete a passing point, to replace a passing point, to add a passing point, or the like. For example, in the case where a large delay to the arrival at a destination is expected due to a traffic jam or the like, the navigation device 100 can omit one of facilities that the user has planned to stop at, and start route guidance of a route that leads to the subsequent passing point or the destination.

The modification suggestion processing described above uses a screen example in which a modification is suggested on a screen that displays the half map display area and the time line display area. However, the present invention is not limited thereto and the screen display may be as illustrated in FIGS. 27(a) and 27(b) and FIG. 28.

Figure 27:
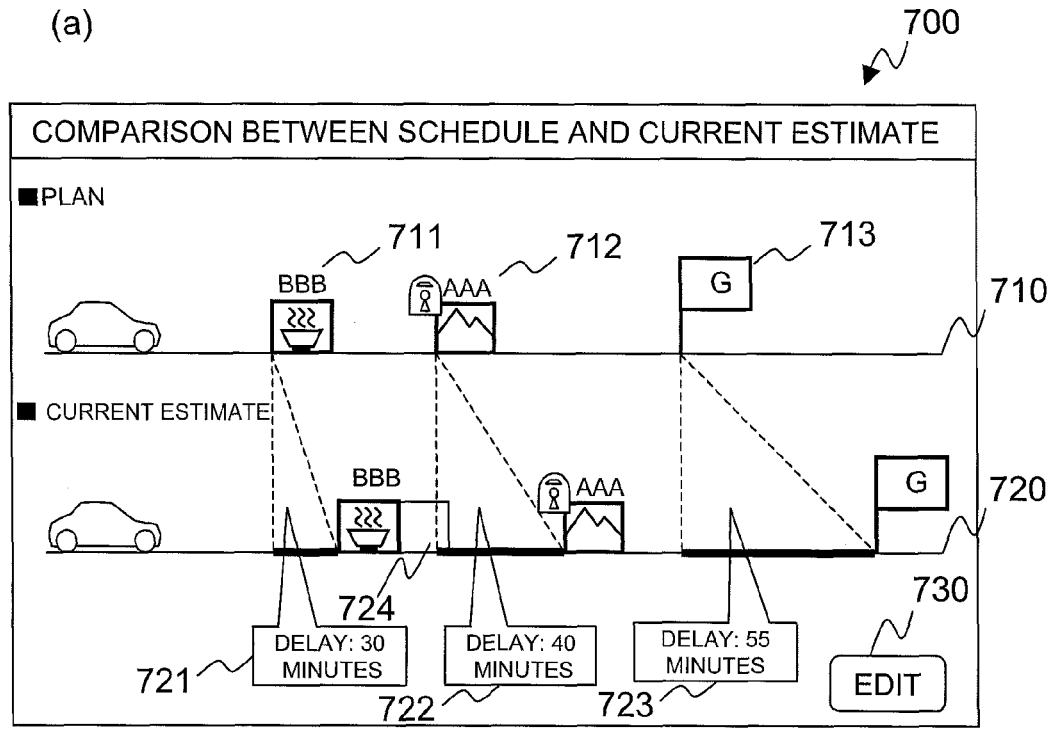
FIGS. 27(a) and 27(b) are a screen display example of the modification suggestion processing for a case where editing is performed.
Figure 28:
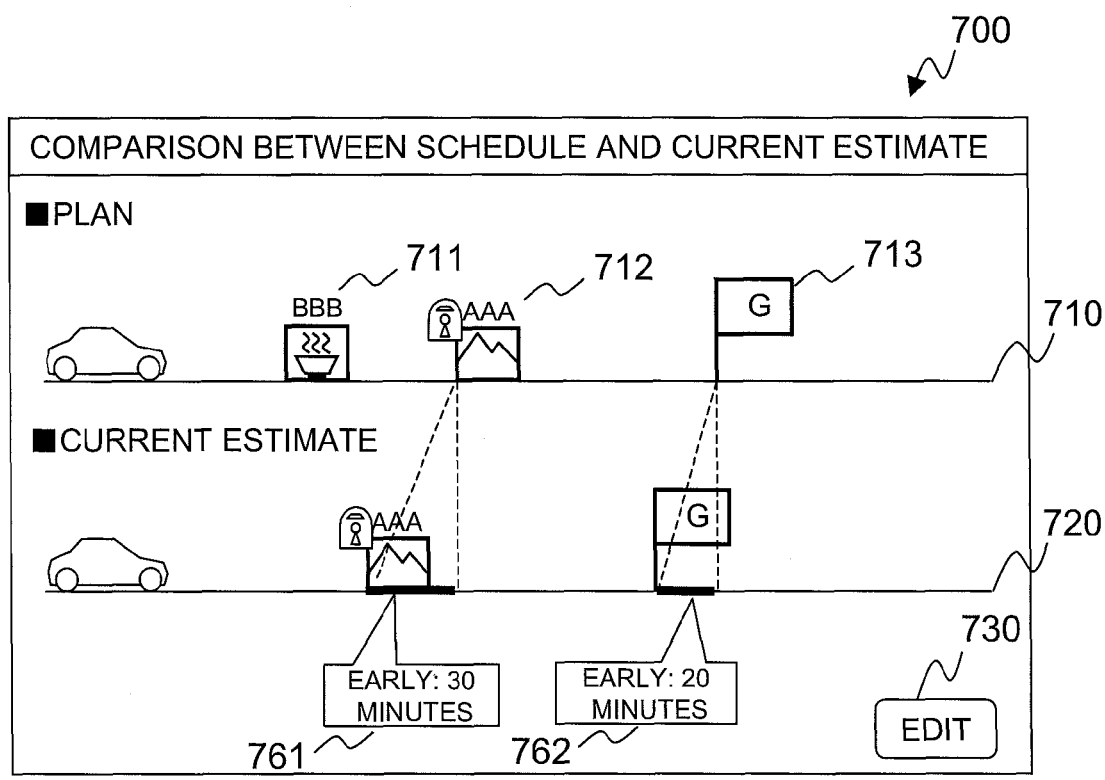
FIG. 28 is a screen display example of the modification suggestion processing for a case where editing is finished.

FIG. 27(a) is an example of a delay display screen 700 which is displayed in Step S404 when it is determined in Step S403 of the modification suggestion processing that there is a given delay or more. The delay display screen 700 is a screen for displaying information on a delay of the predicted time of arrival at a passing point or the destination from the previous prediction of arrival time. An initial travel plan display area 710, a current travel plan display area 720, and a current travel plan editing instruction receiving button 730 are displayed on the delay display screen 700. The plan adjustment processing module 108 constructs the delay display screen 700 in Step S404 and instructs the output processing module 103 to output.

An initial travel plan is displayed in the initial travel plan display area 710. In the initial travel plan display area 710, a time axis stretching from the left-hand side of the screen to the right-hand side of the screen is displayed, and passing points to stop at in the travel plan and the destination are displayed in the form of icons at corresponding points along the time axis. For example, an icon 711 which represents a passing point BBB (eatery), an icon 712 which represents a passing point AAA (tourist site), and an icon 713 which represents the destination are placed at corresponding points along the time axis to be displayed.

A current travel plan and a travel plan predicted based on the current situation are displayed in the current travel plan display area 720. In the current travel plan display area 720, a time axis stretching from the left-hand side of the screen to the right-hand side of the screen is displayed, and passing points to stop at in the travel plan and the destination are displayed in the form of icons at corresponding points along the time axis. For example, an icon that represents the passing point BBB (eatery), an icon that represents the passing point AAA (tourist site), and an icon that represents the destination are placed at corresponding points along the time axis to be displayed. For each passing point and the destination, the amount of delay, namely, the length of delay, from the scheduled arrival time is predicted and displayed in delay amount display areas 721, 722, and 723 along with the icons of the passing points and the destination placed in the current travel plan display area 720. In the case where the length of stay at a passing point is prolonged (when there is a delay due to a traffic jam or the like), the icon of this passing point is expanded forward on the time axis by an amount that corresponds to the amount of delay, and the expansion is displayed as an overstay area 724.

The editing instruction receiving button 730 is used to receive an instruction to start an editing operation for modifying the current travel plan. When the input processing module 102 receives an instruction via the editing instruction receiving button 730, the plan adjustment processing module 108 displays buttons for editing a travel plan in the current travel plan display area 720 as illustrated in FIG. 27(b). For example, when an input is made from the editing instruction receiving button 730, the plan adjustment processing module 108 constructs a screen that displays buttons 731 to 733 for receiving an instruction to add a passing point to stop at between a point in the current travel plan display area 720 that represents the current time and a point in the current travel plan display area 720 that represents the time of arrival at the next passing point, and between every two passing points in the current travel plan display area 720 that are to be visited in succession after the current time. The plan adjustment processing module 108 also displays in a part of the icons of the respective passing points, for example, the upper right corners, delete buttons 734 and 735 for receiving an instruction to delete the passing points from the current travel plan. The plan adjustment processing module 108 also displays an "end editing" button 750 for receiving an instruction to end the editing of the travel plan as illustrated in FIG. 27(b).

When the input receiving module 102 receives an input via one of the passing point adding instruction receiving buttons 731 to 733, which are displayed on the editing screen of FIG. 27(b), the plan adjustment processing module 108 searches for and present addition candidate facilities in the same manner as in Step S408 for a segment to which the button used to receive the input belongs.

When the input receiving module 102 receives an input via one of the delete buttons 734 and 735, which are displayed on the editing screen of FIG. 27(b), the plan adjustment processing module 108 deletes from the route a passing point that is associated with the button used to receive the input, and conducts a search again in the same manner as in Step S406.

FIG. 28 is a diagram illustrating an example of a screen that is displayed when an input is received from the "end editing" button 750 of FIG. 27(b). In this screen example, the passing point BBB has been deleted, which makes the arrival at the destination as well as the arrival at the passing point AAA earlier. Amounts of time, namely, lengths of time by which the predicted time of arrival at the passing point AAA and the predicted time of arrival at the destination are ahead of schedule are displayed in early arrival amount display areas 761 and 762 on this screen. The plan adjustment processing module 108 calculates and displays the early arrival amounts. The plan adjustment processing module 108 uses the same processing as in Steps S401 and S402 of the modification suggestion processing to calculate the early arrival amounts.

A different display screen example in the second embodiment has been described. According to this display screen example, the user can intuitively edit a travel plan while comparing the travel plan against an initial travel plan, and can thus adjust the travel plan with ease. In addition, after editing the travel plan, the user can view at a glance changes in predicted arrival times based on the edited travel plan, and can therefore quickly determine whether re-editing is necessary or not.

The present invention is not limited to the embodiments described above. Further, all or some of the technologies of the invention described above may be used in combination.

The present invention has now been described through embodiments.

While the embodiments described above deal with examples in which the present invention is applied to a navigation device, the present invention is applicable to all kinds of mobile device, not just navigation devices.

REFERENCE SIGNS LIST

1 . . . computing unit, 2 . . . display, 3 . . . storage, 4 . . . audio input/output device, 5 . . . input device, 6 . . . ROM drive, 7 . . . vehicle speed sensor, 8 . . . gyro sensor, 9 . . . GPS receiving device, 10 . . . FM multiplex broadcast receiving device, 11 . . . beacon receiving device, 12 . . . communication device, 21 . . . CPU, 22 . . . RAM, 23 . . . ROM, 24 . . . I/F, 25 . . . bus, 41 . . . microphone, 42 . . . speaker, 51 . . . touch panel, 52 . . . dial switch, 100 . . . navigation device, 101 . . . main control module, 102 . . . input receiving module, 103 . . . output processing module, 104 . . . time line operation processing module, 105 . . . POI card management module, 106 . . . POI event processing module, 107 . . . check processing module, 200 . . . link table, 250 . . . POI card table, 300 . . . input information table, 350 . . . check result table, 500 . . . network, 510 . . . mobile device, 520 . . . computer, 530 . . . POI management server machine, 531 . . . storage, 532 . . . POI card data

The invention claimed is:

1. A navigation device, comprising:
   display unit;
   storage unit adapted to store facility information for identifying a plurality of facilities, location information of each of the facilities, and an icon of each of the facilities; and
   event processing unit adapted to configure a display screen in a manner that causes the display unit to display a first display area for displaying the icons of the facilities and a second display area for displaying a time line of a predetermined period, wherein the second display area comprises a free area that is an area for designating as a destination an icon that has no limitations on arrival time and departure time, and wherein the second display area comprises a lock area that is an area for designating as a destination an icon that has limitations on arrival time and departure time;
   wherein the event processing unit is configured to:
      when a plurality of icons displayed in the first display area are placed on the time line displayed in the second display area, use the location information of facilities that are associated with the plurality of icons to search for a route for visiting the facilities in order of the placement of the icons on the time line, and calculate a required time necessary to travel between each of the facilities represented on the time line; and
      when one of the plurality of icons placed on the time line is placed in the lock area and is of a facility that cannot be reached at a time and date corresponding to a point on the time line where the one of the plurality of icons is placed, display the one of the plurality of icons as "incompatible"; and
   wherein, in processing of displaying the one of the plurality of icons as "incompatible" when the one of the plurality of icons is placed in the free area and is of a facility that cannot be reached at a time and date corresponding to a point on the time line of the second display area where the one of the plurality of icons is placed, the event processing unit avoids displaying the icon that is placed in the free area as "incompatible".

2. A navigation device according to claim 1, further comprising:
   facility designation receiving unit adapted to receive a designation of a facility; and
   travel period receiving unit adapted to receive a designation of a travel period;
   wherein the event processing unit displays, in the first display area, the icon that is associated with a facility received by the facility designation receiving unit and displays, in the second display area, a time line of all or part of a period equivalent to the travel period received by the travel period receiving unit.

3. A navigation device according to claim 1, wherein the event processing unit is configured to:
   receive a designation of an arrival time and date and a length of stay period for each of the plurality of icons placed on the time line of the second display area; and
   use the location information of facilities that are associated with the plurality of icons to search for a route for visiting the facilities in order of the placement of the icons, and calculate a required time necessary to travel between each of the facilities represented on the time line, and add the length of stay period to the required time.

4. A navigation device according to claim 1, wherein, when one of the plurality of icons displayed in the first display area is moved to the second display area, the event processing unit displays the one of the plurality of icons in a reduced size.

5. A navigation device according to claim 1, wherein, when one of the plurality of icons displayed in the first display area is moved to the second display area, the event processing unit displays the time line of the second display area in an enlarged size.

6. A navigation device according to claim 1, wherein, in processing of searching for the route, the event processing unit obtains, for each of the plurality of icons placed on the time line, traffic information at a time of departure from each facility represented by an icon arranged on the time line, and uses the traffic information to search for the route.

7. A navigation device according to claim 1, further comprising communication unit adapted to transmit and receive information to and from an external device;
   wherein, when displaying in the first display area the icon that is associated with a facility received from the facility designation receiving unit, the event processing unit obtains the icon from the external device via the communication unit.

8. A non-transitory storage device that stores a program, executable by a control unit, usable by a navigation device, the navigation device comprising:
   the control unit; and
   a display unit;
   the storage device adapted to store facility information for identifying a plurality of facilities, location information of each of the facilities, and an icon of each of the facilities;
   the program stored on the storage device configured to cause the control unit to execute:
      a screen configuring step of configuring a display screen in a manner that causes the display unit to display a first display area for displaying the icons of the facilities and a second display area for displaying a time line of a predetermined period, wherein the second display area comprises a free area that is an area for designating as a destination an icon that has no limitations on arrival time and departure time, and wherein the second display area comprises a lock area that is an area for designating as a destination an icon that has limitations on arrival time and departure time;
      a required time identifying step of, when a plurality of icons displayed in the first display area are placed on the time line displayed in the second display area, using the location information of facilities that are associated with the plurality of icons to search for a route for visiting the facilities in order of the placement of the icons on the time line, and calculating a required time necessary to travel between each of the facilities represented on the time line; and
      a compatibility displaying step of, when one of the plurality of icons placed on the time line is placed in the lock area and is of a facility that cannot be reached at a time and date corresponding to a point on the time line where the one of the plurality of icons is placed, displaying the one of the plurality of icons as "incompatible"; and
   wherein, in processing of displaying the one of the plurality of icons as "incompatible" when the one of the plurality of icons is placed in the free area and is of a facility that cannot be reached at a time and date corresponding to a point on the time line of the second display area where the one of the plurality of icons is placed, the program avoids displaying the icon that is placed in the free area as "incompatible".

9. A display method for a navigation device, the navigation device comprising:

display unit;

storage unit adapted to store facility information for identifying a plurality of facilities, location information of each of the facilities, and an icon of each of the facilities; and event processing unit adapted to configure a display screen in a manner that causes the display unit to display a first display area for displaying the icons of the facilities and a second display area for displaying a time line of a predetermined period, wherein the second display area comprises a free area that is an area for designating as a destination an icon that has no limitations on arrival time and departure time, and wherein the second display area comprises a lock area that is an area for designating as a destination an icon that has limitations on arrival time and departure time;

the display method comprising:

when a plurality of icons displayed in the first display area are placed on the time line displayed in the second display area, using, by the event processing unit, the location information of facilities that are associated with the plurality of icons to search for a route for visiting the facilities in order of the placement of the icons on the time line, and calculating a required time necessary to travel between each of the facilities represented on the time line; and when one of the plurality of icons placed on the time line is placed in the lock area and is of a facility that cannot be reached at a time and date corresponding to a point on the time line where the one of the plurality of icons is placed, displaying, by the event processing unit, the one of the plurality of icons as "incompatible"; and wherein, in processing of displaying the one of the plurality of icons as "incompatible" when the one of the plurality of icons is placed in the free area and is of a facility that cannot be reached at a time and date corresponding to a point on the time line of the second display area where the one of the plurality of icons is placed, the display method avoids displaying the icon that is placed in the free area as "incompatible".

10. A navigation device according to claim 1, further comprising:

current location obtaining unit adapted to obtain a current location;

prediction unit adapted to predict, from the current location, an arrival time for each of a predetermined point at which a brief stop is to be made and a predetermined destination; and editing unit adapted to receive editing on information of the time line if the predicted arrival time is changed by a given amount.

11. A navigation device according to claim 10, wherein, when the change of the predicted arrival time is a delay of a given degree or more, the editing unit deletes a point at which a brief stop is to be made to be visited next from the information of the time line.

12. A navigation device according to claim 10, wherein, when the change of the predicted arrival time is a delay of a given degree or more, the editing unit replaces a point at which a brief stop is to be made to be visited next with another point at which a brief stop is to be made in the information of the time line.

13. A navigation device according to claim 12, wherein the another point at which a brief stop is to be made that the editing unit uses as a replacement for the point at which a brief stop is to be made to be visited next is a facility belonging to the same genre as a genre of the replaced point at which a brief stop is to be made.

14. A navigation device according to claim 10, wherein, when the predicted arrival time is earlier by a given amount or more, the editing unit adds a point at which a brief stop is to be made to be visited before the point at which a brief stop is to be made that comes up next in the information of the time line.

15. A navigation device according to claim 14, wherein the added point at which a brief stop is to be made is a facility belonging to a genre different from a genre of the point at which a brief stop is to be made that comes up next.

\* \* \* \* \*